US009340711B2

(12) United States Patent
Ono et al.

(10) Patent No.: US 9,340,711 B2
(45) Date of Patent: May 17, 2016

(54) IMAGE DISPLAY SEALANT DAM COMPOSITION AND IMAGE DISPLAY HAVING THE SAME

(71) Applicant: MOMENTIVE PERFORMANCE MATERIALS JAPAN LLC, Tokyo (JP)

(72) Inventors: Kazuhisa Ono, Tokyo (JP); Koji Okawa, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 0 days.

(21) Appl. No.: 14/429,169

(22) PCT Filed: Mar. 28, 2014

(86) PCT No.: PCT/JP2014/059358
§ 371 (c)(1),
(2) Date: Mar. 18, 2015

(87) PCT Pub. No.: WO2014/181610
PCT Pub. Date: Nov. 13, 2014

(65) Prior Publication Data
US 2015/0218427 A1    Aug. 6, 2015

(30) Foreign Application Priority Data

May 8, 2013   (JP) ................................. 2013-098593
Mar. 11, 2014  (JP) ................................. 2014-047933

(51) Int. Cl.
| C08L 83/00 | (2006.01) |
| C09J 143/04 | (2006.01) |
| C08L 83/08 | (2006.01) |
| G02F 1/1339 | (2006.01) |
| C08K 5/5425 | (2006.01) |
| C08G 77/20 | (2006.01) |
| C08G 77/28 | (2006.01) |

(52) U.S. Cl.
CPC ............ *C09J 143/04* (2013.01); *C08K 5/5425* (2013.01); *C08L 83/08* (2013.01); *G02F 1/1339* (2013.01); *C08G 77/20* (2013.01); *C08G 77/28* (2013.01); *C08L 2312/06* (2013.01); *G02F 2201/50* (2013.01); *G02F 2202/28* (2013.01)

(58) Field of Classification Search
None
See application file for complete search history.

(56) References Cited

U.S. PATENT DOCUMENTS

| 3,816,282 | A | * | 6/1974 | Viventi | ................... | B01J 19/081 |
| | | | | | | 522/172 |
| 4,707,503 | A | * | 11/1987 | Itoh | ..................... | C08K 5/5406 |
| | | | | | | 522/99 |
| 4,908,395 | A | | 3/1990 | Kurita et al. | | |
| 4,935,455 | A | * | 6/1990 | Huy | ...................... | C03C 25/106 |
| | | | | | | 522/83 |
| 4,946,874 | A | | 8/1990 | Lee et al. | | |
| 5,100,993 | A | * | 3/1992 | Hida | ..................... | C08K 5/5406 |
| | | | | | | 522/172 |
| 5,158,988 | A | * | 10/1992 | Kurita | ..................... | C08K 5/53 |
| | | | | | | 522/64 |
| 5,328,941 | A | | 7/1994 | Hayashi et al. | | |
| 5,420,222 | A | * | 5/1995 | Stepp | ...................... | C08L 83/04 |
| | | | | | | 522/35 |
| 5,684,113 | A | | 11/1997 | Nakanishi et al. | | |
| 5,952,397 | A | * | 9/1999 | Fujiki | ................. | B29C 33/3878 |
| | | | | | | 264/496 |
| 2013/0065983 | A1 | | 3/2013 | Ono et al. | | |

FOREIGN PATENT DOCUMENTS

| EP | 590542 A2 | 4/1994 |
| JP | 02245060 A | 9/1990 |
| JP | 03064389 A | 3/1991 |
| JP | 03074463 A | 3/1991 |
| JP | 04198270 A | 7/1992 |
| JP | 06107951 A | 4/1994 |
| JP | 06345970 A | 12/1994 |
| JP | 2002121259 A | 4/2002 |
| JP | 2002371261 A | 12/2002 |
| JP | 2005171189 A | 6/2005 |
| JP | 2008280368 A | 11/2008 |
| JP | 5010761 B2 | 8/2012 |
| WO | 2012086402 A1 | 6/2012 |

OTHER PUBLICATIONS

International Search Report (ISR) dated Jul. 1, 2014 issued in International Application No. PCT/JP2014/059358.
Japanese Office Action (Notification of Reasons for Rejection) dated Apr. 8, 2014 issued in counterpart Japanese Application No. 2014-047933.
U.S. Appl. No. 14/429,138, filed Mar. 18, 2015, First Named Inventor: Kazuhisa Ono, Title: "Image Display Sealant Dam Composition and Image Display Having the Same".

* cited by examiner

*Primary Examiner* — Robert S Loewe
(74) *Attorney, Agent, or Firm* — Holtz, Holtz & Volek PC

(57) ABSTRACT

An image display sealant dam composition including (A) a polyorganosiloxane having a mercaptoalkyl bonded to a silicon; (B) an aliphatic unsaturated group-containing polyorganosiloxane including an aliphatic unsaturated group-containing linear polyorganosiloxane (B1), and a branched polyorganosiloxane (B2) having $SiO_{4/2}$ units, $R'_3SiO_{1/2}$ units and $R'_2SiO_{2/2}$ units, and optionally having $R'SiO_{3/2}$ units, at least three R' groups per molecule of the branched polyorganosiloxane (B2) are aliphatic unsaturated groups, the proportion of the number of the aliphatic unsaturated groups in (B2) to the total number of the aliphatic unsaturated groups in (B) is more than 50% and not more than 95%; (C) a photoreaction initiator; (D) a silane compound; and (E) an MQ resin having a weight average molecular weight of 2,000 to 2,500,000 and/or an MDQ resin having a weight average molecular weight of 2,000 to 1,000,000.

18 Claims, No Drawings

IMAGE DISPLAY SEALANT DAM COMPOSITION AND IMAGE DISPLAY HAVING THE SAME

CROSS-REFERENCE TO RELATED APPLICATION

This application is a United States National Phase application of International Application No. PCT/JP2014/059358 filed Mar. 28, 2014.

TECHNICAL FIELD

The present invention relates to an image display sealant dam composition and an image display using the composition.

BACKGROUND ART

In recent years, attentions have been drawn to flat panel image displays such as liquid crystal displays, plasma displays and organic EL displays. Flat panel image displays usually have a display region (an image display component) in which a plurality of pixels that are composed of semiconductor layers, phosphor layers or emission layers constituting active elements are arranged in a matrix form between a pair of substrates including at least one optically transparent substrate such as glass. In general, this display region (image display component) and a protective component formed of glass or an optical plastic such as acrylic resin are attached to each other while the periphery is tightly sealed with an adhesive.

In such image displays, a sealant is disposed between the protective component and the image display component to prevent a decrease in visibility (viewability) due to factors such as reflection of outside light or indoor illumination light. For example, the sealants are UV curable silicone resin compositions (Patent Literature 1) or heat curable silicone resin compositions (Patent Literature 2). In addition to silicone resin compositions, epoxy resin compositions may be used as sealants (Patent Literature 3).

CITATION LIST

Patent Literature

Patent Literature 1: WO 2012/086402
Patent Literature 2: Japanese Patent Application Kokai Publication No. H6-345970
Patent Literature 3: Japanese Patent Application Kokai Publication No. 2002-121259

DISCLOSURE OF INVENTION

Technical Problem

When the UV curable resin composition is applied as a sealant to an image display component (for example, a liquid crystal display panel), the composition exhibits fluidity and may be squeezed out of the display component and further to the backside of the display component. This problem is more marked in recent years with the increase in size of the display components. A known approach to solving this problem is to form a frame of a dam composition beforehand on the display component or the protective component and to apply the composition inside the frame, thereby preventing defects such as squeezing out.

Patent Literature 3 also discloses that fine silica is added to the epoxy resin composition sealant to form a dam material. However, Patent Literature 3 does not describe any hardness or adhesion of cured products of the dam material. Further, Patent Literature 3 does not describe the use of other types of resin sealants as dam materials. Although Examples disclosed in Patent Literature 2 use a dam material, the chemical composition of the material is not described in detail. Further, Patent Literature 2 describes that this dam material was thermally cured, but there is no description of the hardness or the adhesion of the cured product.

An object of the present invention is to provide dam compositions that can give cured products serving as dam materials exhibiting appropriate hardness and adhesion with respect to adherends, and to provide image displays manufactured with the compositions. Preferably, a further object of the invention is to eliminate the possibility that the viewability of image displays may be decreased by the presence of conspicuous joints between a dam frame and a sealant applied inside the frame. That is, a further object of the invention is to provide dam compositions which have the above properties and also can form inconspicuous joints with sealants, and to provide image displays manufactured with the compositions.

Solution to Problem

Invention 1 resides in an image display sealant dam composition comprising:
(A) a polyorganosiloxane having a mercaptoalkyl group bonded to a silicon atom, the polyorganosiloxane (A) having a viscosity at 23° C. of 20 to 25,000 cP;
(B) aliphatic unsaturated group-containing polyorganosiloxanes including
an aliphatic unsaturated group-containing linear polyorganosiloxane (B1) represented by Formula (I):

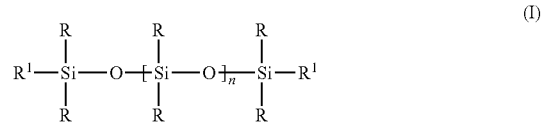

(in the formula:
each $R^1$ group independently represents an aliphatic unsaturated group,
each R group independently represents a C1 to C6 alkyl group or a C6 to C12 aryl group, and 1 to 60 mol % of the total R groups are C6 to C12 aryl groups, and
the letter n is a value such that the viscosity at 23° C. becomes 10,000 to 1,000,000 cP), and
a branched polyorganosiloxane (B2) having $SiO_{4/2}$ units, $R'_3SiO_{1/2}$ units and $R'_2SiO_{2/2}$ units, and optionally further having $R'SiO_{3/2}$ units (in the formulae, each R' group is independently a C1 to C6 alkyl group or an aliphatic unsaturated group), at least three R' groups per molecule of the branched polyorganosiloxane (B2) are aliphatic unsaturated groups (the proportion of the number of the aliphatic unsaturated groups in (B2) to the total number of the aliphatic unsaturated groups in (B) is more than 50% and not more than 95%);
(C) a photoreaction initiator;
(D) a silane compound; and
(E) an MQ resin having a weight average molecular weight of 2,000 to 2,500,000 and/or an MDQ resin having a weight average molecular weight of 2,000 to 1,000,000;

wherein the ratio of the number of the mercaptoalkyl groups in (A) to the number of the aliphatic unsaturated groups in (B) is 0.5 to 3.0;
the amount of (E) is 30 to 200 parts by weight per 100 parts by weight of (B); and
the composition has a viscosity at 23° C. of 20,000 to 150,000 cP.

The present composition has a high viscosity of 20,000 cP or more. Thus, there is a general concern that wetting properties are low and cured products exhibit poor adhesion. By virtue of the above configuration, however, the composition of the invention can give cured products exhibiting good adhesion and appropriate hardness for use as dam materials. In addition to these properties, the composition preferably eliminates the possibility that the viewability of image displays may be decreased by the presence of a conspicuous joint between a dam frame and a sealant applied inside the frame. That is, the present composition can form inconspicuous joints with sealants.

Invention 2 resides in an image display sealant dam composition according to Invention 1, wherein the thixotropic ratio $V_{6rpm}/V_{12rpm}$ is 1.02 to 1.9 wherein $V_{6rpm}$ and $V_{12rpm}$ are values of the viscosity (cP) of the dam composition measured with a B-type rotational viscometer at 23° C. and a rotational speed of 6 rpm, and at 23° C. and a rotational speed of 12 rpm, respectively.

Invention 3 resides in an image display sealant dam composition according to Invention 1 or 2, wherein the component (E) comprises an MQ resin having a weight average molecular weight of 1,000,000 to 2,500,000.

Invention 4 resides in an image display sealant dam composition according to Invention 3, wherein the components (E) further comprise an MDQ resin having a weight average molecular weight of 2,000 to 1,000,000.

Invention 5 resides in an image display sealant dam composition according to any of Inventions 1 to 4, wherein the content of (C) is 0.05 to 50 parts by weight per 100 parts by weight of (B).

Invention 6 resides in an image display sealant dam composition according to any of Inventions 1 to 5, wherein the component (D) is one or more aliphatic unsaturated group-containing silane compounds selected from the group consisting of 3-methacryloxypropyltriethoxysilane, 3-methacryloxypropyltrimethoxysilane, vinyltrimethoxysilane and vinyltriethoxysilane.

Invention 7 resides in an image display that comprises an image display component and a protective component sealed with the image display sealant dam composition described in any of Inventions 1 to 6.

Advantageous Effects of Invention

The inventive dam compositions may form dam frames in image displays which exhibit appropriate hardness and adhesion with respect to adherends. According to a preferred embodiment, the dam frame further has an inconspicuous joint with a sealant applied inside the frame, and consequently image displays having good viewability may be obtained.

BEST MODE FOR CARRYING OUT INVENTION

An image display sealant dam composition according to the present invention comprises:
(A) a polyorganosiloxane having a mercaptoalkyl group bonded to a silicon atom, the polyorganosiloxane (A) having a viscosity at 23° C. of 20 to 25,000 cP;
(B) aliphatic unsaturated group-containing polyorganosiloxanes including
an aliphatic unsaturated group-containing linear polyorganosiloxane (B1) represented by Formula (I):

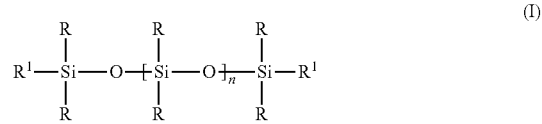

(in the formula:
each $R^1$ group independently represents an aliphatic unsaturated group,
each R group independently represents a C1 to C6 alkyl group or a C6 to C12 aryl group, and 1 to 60 mol % of the total R groups are C6 to C12 aryl groups, and
the letter n is a value such that the viscosity at 23° C. becomes 10,000 to 1,000,000 cP), and
a branched polyorganosiloxane (B2) having $SiO_{4/2}$ units, $R'_3SiO_{1/2}$ units and $R'_2SiO_{2/2}$ units, and optionally further having $R'SiO_{3/2}$ units (in the formulae, each R' group is independently a C1 to C6 alkyl group or an aliphatic unsaturated group), at least three R' groups per molecule of the branched polyorganosiloxane (B2) are aliphatic unsaturated groups (the proportion of the number of the aliphatic unsaturated groups in (B2) to the total number of the aliphatic unsaturated groups in (B) is more than 50% and not more than 95%);
(C) a photoreaction initiator;
(D) a silane compound; and
(E) an MQ resin having a weight average molecular weight of 2,000 to 2,500,000 and/or an MDQ resin having a weight average molecular weight of 2,000 to 1,000,000.

The composition of the invention includes a polyorganosiloxane (A) having a mercaptoalkyl group bonded to a silicon atom. This polyorganosiloxane has a viscosity at 23° C. of 20 to 25,000 cP.

The average number of the mercaptoalkyl groups bonded to silicon atoms in one molecule of (A) may be 2 to 20 to suppress excessive cure shrinkage while ensuring a stable structure by a crosslinking reaction. In particular, the average number is preferably from more than 2 to not more than 10, and more preferably from 3 to 7.

In the polyorganosiloxane (A), the alkyl moieties of the mercaptoalkyl group bonded to a silicon atom may be C1 to C6 alkyl groups. Examples of the mercaptoalkyl group include mercaptomethyl, 2-mercaptoethyl, 3-mercaptopropyl, 4-mercaptobutyl and 6-mercaptohexyl. For reasons such as easy synthesis, mercaptomethyl and 3-mercaptopropyl are preferable, and 3-mercaptopropyl is more preferable.

In the polyorganosiloxane (A), the organic groups other than the mercaptoalkyl group bonded to a silicon atom may be substituted or unsubstituted monovalent hydrocarbon groups (except aliphatic unsaturated groups). Specific examples include alkyl groups such as C1 to C6 alkyl groups (for example, methyl, ethyl and propyl); cycloalkyl groups such as C3 to C10 cycloalkyl groups (for example, cyclohexyl); aryl groups such as C6 to C12 aryl groups (for example, phenyl, tolyl and xylyl); aralkyl groups such as C7 to C13 aralkyl groups (for example, 2-phenylethyl and 2-phenylpropyl); and substituted hydrocarbon groups such as halogen-substituted hydrocarbon groups (for example, chloromethyl, chlorophenyl and 3,3,3-trifluoropropyl). For reasons such as easy synthesis, alkyl groups are preferable. In particular, methyl, ethyl and propyl are preferable, and methyl is more preferable. To adjust refractive index, aryl groups may be used in combination therewith. For reasons such as easy synthesis, in particular, phenyl is preferable.

The main chain structures of (A) may be any of linear structures, branched structures and ring structures, with branched structures being preferable. Examples include branched polyorganosiloxanes containing mercaptoalkyl groups which have $R''SiO_{3/2}$ units, $R''_3SiO_{1/2}$ units and $R''_2SiO_{2/2}$ units, and optionally further have $SiO_{4/2}$ units (in the formulae, each of R" is independently an unsubstituted or substituted monovalent hydrocarbon group (except an aliphatic unsaturated group)), and which are such that 2 to 20 R" groups per molecule are mercaptoalkyl groups. Examples of the mercaptoalkyl groups and the unsubstituted or substituted monovalent hydrocarbon groups include those mentioned hereinabove. The mercaptoalkyl groups R" may be present in any of the above R"-containing units, but are preferably present in the form of $R''SiO_{3/2}$ units. The mercaptoalkyl groups and the unsubstituted or substituted monovalent hydrocarbon groups may be any of the aforementioned groups. From the viewpoints of workability and crosslinking reactivity, the ratio of the number of the siloxane units having mercaptoalkyl groups to the number of the siloxane units having no mercaptoalkyl groups is preferably 1:60 to 1:5, although not limited thereto.

The viscosity of (A) at 23° C. is 20 to 25,000 cP. From the viewpoint of dam formation, a high viscosity is preferable as long as the compatibility with the components (B) is not markedly deteriorated. It is, however, possible to use compounds having a low viscosity at 23° C. of 20 to 2,000 cP, for example, 50 to 500 cP.

In the specification, the viscosity is a value measured at 23° C. on a B-type rotational viscometer (Vismetron VDA-L) (manufactured by Shibaura System) with rotors Nos. 2 to 4 at 30 to 60 rpm. (When otherwise specified, the rotational speeds are not limited to the above.)

The number of the mercapto groups in (A) may be measured by colorimetric titration with iodine. This method utilizes the reaction represented by:

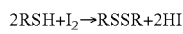
$2RSH + I_2 \rightarrow RSSR + 2HI$

During the titration, the titration liquid turns light yellow when a slight excess of iodine is added.

The polyorganosiloxane (A) preferably has high transparency. The level of transparency may be such that the transmittance to visible light wavelengths (360 to 780 nm) is 80% or more when the polyorganosiloxane (A) packed in a container with a thickness of 10 mm is analyzed at 23° C. on a spectrophotometer to measure the transmittance. To ensure that cured products of the present compositions will stably exhibit transparency, the transmittance is preferably 90% or more.

The polyorganosiloxanes (A) may be prepared by any methods without limitation. For example, they may be produced by the hydrolysis, polycondensation and re-equilibration of alkylchlorosilanes or mercaptoalkylalkoxysilanes such as mercaptopropyltrimethoxysilane, mercaptopropyltriethoxysilane, mercaptopropylmethyldimethoxysilane, mercaptopropylmethyldiethoxysilane, mercaptopropyldimethylmethoxysilane and mercaptopropyldimethylethoxysilane, with desired alkylchlorosilanes, alkylalkoxysilanes or silanol-containing siloxanes.

The components (A) may be used singly, or two or more may be used in combination.

The composition of the invention includes aliphatic unsaturated group-containing polyorganosiloxanes (B) including an aliphatic unsaturated group-containing linear polyorganosiloxane (B1) represented by Formula (I):

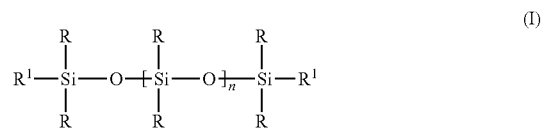

(in the formula:
each R1 group independently represents an aliphatic unsaturated group,
each R group independently represents a C1 to C6 alkyl group or a C6 to C12 aryl group, and 1 to 60 mol % of the total R groups are C6 to C12 aryl groups, and
the letter n is a value such that the viscosity at 23° C. becomes 10,000 to 1,000,000 cP), and
a branched polyorganosiloxane (B2) having $SiO_{4/2}$ units, $R'_3SiO_{1/2}$ units and $R'_2SiO_{2/2}$ units, and optionally further having $R'SiO_{3/2}$ units (in the formulae, each R' group is independently a C1 to C6 alkyl group or an aliphatic unsaturated group), at least three R' groups per molecule of the branched polyorganosiloxane (B2) are aliphatic unsaturated groups (the proportion of the number of the aliphatic unsaturated groups in (B2) to the total number of the aliphatic unsaturated groups in (B) is more than 50% and not more than 95%).

In the polyorganosiloxanes (B), the component (B2) is added for purposes such as adjusting the hardness and the elongation of cured products. Further, the use of (B2) may enhance adhesion with respect to adherends, in particular, polarizing plates. The component (B2) may be used in such an amount that the number of the aliphatic unsaturated groups in (B2) represents 50 to 95% of the total number of the aliphatic unsaturated groups in (B). From the viewpoints of curability and followability, the proportion is preferably 55 to 85%.

In Formula (I) regarding (B1), $R^1$ groups are aliphatic unsaturated groups. $R^1$ groups at both terminals may be the same or different from each other, and are preferably the same as each other.

Examples of the aliphatic unsaturated groups include alkenyl groups such as C2 to C6 alkenyl groups (for example, vinyl, propenyl, butenyl and hexenyl). Alkenyl groups having unsaturated terminals are more preferable. For reasons such as easy synthesis, vinyl groups are preferable.

In Formula (I), R groups are C1 to C6 alkyl groups (for example, methyl, ethyl and propyl) or C6 to C12 aryl groups (for example, phenyl, tolyl and xylyl). Rs may be the same or different from one another.

It is preferable that 1 to 60 mol % of Rs be C6 to C12 aryl groups from the viewpoint of adjusting refractive index; it is preferable that 1 to 50 mol % of R groups be C6 to C12 aryl groups from the viewpoints of viscosity and thixotropy; and it is more preferable that the proportion be 1 to 35 mol %.

For reasons such as easy synthesis, the C1 to C6 alkyl groups are preferably methyl groups, and the C6 to C12 aryl groups are preferably phenyl groups.

The polyorganosiloxane (B1) represented by Formula (I) is preferably such that 1 to 60 mol % of R groups are phenyl groups and the balance is methyl groups, more preferably such that 1 to 50 mol % of R groups are phenyl groups and the balance is methyl groups, and still more preferably such that 1 to 35 mol % of R groups are phenyl groups and the balance is methyl groups.

From the viewpoint of the workability (sagging properties) of the composition, the viscosity of (B1) at 23° C. is 10,000 to 1,000,000 cP, and preferably 15,000 to 1,000,000 cP.

The number of the aliphatic unsaturated groups in (B1) may be obtained from the molecular weight calculated based on an average structural formula according to NMR.

The polyorganosiloxanes (B1) may be prepared by any methods without limitation. For example, they may be obtained by the polycondensation and re-equilibration of chlorosilanes necessary for the desired structures such as dimethyldichlorosilane, diphenyldichlorosilane, methylphenyldichlorosilane and dimethylvinylchlorosilane, or by the cohydrolysis, polycondensation and re-equilibration of alkoxysilanes necessary for the desired structures such as dimethyldimethoxysilane, diphenyldimethoxysilane, methylphenyldimethoxysilane and dimethylvinylmethoxy. Alternatively, the compounds may be obtained by the ring-opening polymerization and re-equilibration of siloxanes necessary for the desired structures such as 1,1,3,3,5,5,7,7-octamethylcyclotetrasiloxane, 1,1,3,3,5,5,7,7-octaphenylcyclotetrasiloxane and 1,1,3,3-tetramethyl-1,3-divinyldisiloxane, in the presence of alkali catalysts (such as alkali metal hydroxide salts, alkali metal silanolates and ammonium hydroxide salts) or acid catalysts (such as sulfuric acid, sulfuric acid silanolate and trifluoromethanesulfonic acid).

The components (B1) may be used singly, or two or more may be used in combination.

The component (B2) is a branched polyorganosiloxane which has $SiO_{4/2}$ units, $R'_3SiO_{1/2}$ units and $R'_2SiO_{2/2}$ units, and optionally further has $R'SiO_{3/2}$ units (in the formulae, each R' group is independently a C1 to C6 alkyl group or an aliphatic unsaturated group), and which is such that at least three R' groups per molecule are aliphatic unsaturated groups.

Examples of the components (B2) include branched polyorganosiloxanes having 6 to 10 mol of the $SiO_{4/2}$ units and 4 to 8 mol of the $R'_3SiO_{1/2}$ units per 1 mol of the $R'_2SiO_{2/2}$ unit. Preferably, the polyorganosiloxanes (B2) are solids or are viscous semisolid resins or liquids at normal temperature. For example, the weight average molecular weight may be 1,000 to 400,000, and preferably 2,000 to 200,000. The weight average molecular weight is a value measured by gel permeation chromatography (GPC) using a polystyrene calibration curve.

Examples of the aliphatic unsaturated groups represented by R' groups include the aliphatic unsaturated groups mentioned with respect to (B1), specifically, alkenyl groups such as C2 to C6 alkenyl groups (for example, vinyl, propenyl, butenyl and hexenyl). Alkenyl groups having unsaturated terminals are more preferable. For reasons such as easy synthesis, vinyl groups are preferable. The aliphatic unsaturated groups R' may be present in any of the above R'-containing units, but are preferably present in the form of $R'_2SiO$ units.

R' groups other than the aliphatic unsaturated groups are C1 to C6 alkyl groups (for example, methyl, ethyl and propyl). In view of heat resistance, methyl groups are preferable.

The components (B2) may be used singly, or two or more may be used in combination.

The composition of the invention includes a photoreaction initiator (C). The initiator (C) is a component that functions as a radical initiator or a sensitizer in the photocrosslinking between (A) and (B). From the viewpoint of reactivity, examples of the components (C) include aromatic hydrocarbons, acetophenone and derivatives thereof, benzophenone and derivatives thereof, o-benzoylbenzoate esters, benzoin and benzoin ether and derivatives thereof, xanthone and derivatives thereof, disulfide compounds, quinone compounds, halogenated hydrocarbons and amines, and organic peroxides. From the viewpoints of the compatibility with silicones as well as stability, more preferred initiators are compounds having a substituted or unsubstituted benzoyl group, and organic peroxides.

Examples of the initiators (C) include acetophenone, propiophenone, 2-hydroxy-2-methylpropiophenone, 2,2-dimethoxy-1,2-diphenylethan-1-one (IRGACURE 651: manufactured by BASF AG), 2-hydroxy-2-methyl-1-phenyl-propan-1-one (DAROCUR 1173: manufactured by BASF AG), 1-hydroxy-cyclohexyl-phenyl-ketone (IRGACURE 184: manufactured by BASF AG), 1-[4-(2-hydroxyethoxy)-phenyl]-2-hydroxy-2-methyl-1-propan-1-one (IRGACURE 2959: manufactured by BASF AG), 2-hydroxy-1-{4-[4-(2-hydroxy-2-methyl-propionyl)-benzyl]phenyl}-2-methyl-propan-1-one (IRGACURE 127: manufactured by BASF AG), 2-methyl-1-(4-methylthiophenyl)-2-morpholinopropan-1-one (IRGACURE 907: manufactured by BASF AG), 2-benzyl-2-dimethylamino-1-(4-morpholinophenyl)-butanone-1 (IRGACURE 369: manufactured by BASF AG), 2-(dimethylamino)-2-[(4-methylphenyl)methyl]-1-[4-(4-morpholinyl)phenyl]-1-butanone (IRGACURE 379: manufactured by BASF AG); 2,4,6-trimethylbenzoyl-diphenyl-phosphine oxide (LUCIRIN TPO: manufactured by BASF AG), bis(2,4,6-trimethylbenzoyl)-phenylphosphine oxide (IRGACURE 819: manufactured by BASF AG); 1,2-octanedione 1-[4-(phenylthio)-2-(O-benzoyloxime)] (IRGACURE OXE 01: manufactured by BASF AG), ethanone 1-[9-ethyl-6-(2-methylbenzoyl)-9H-carbazol-3-yl]-1-(O-acetyloxime) (IRGACURE OXE 02: manufactured by BASF AG); a mixture of oxyphenylacetic acid 2-[2-oxo-2-phenylacetoxyethoxy]ethyl ester and oxyphenylacetic acid 2-(2-hydroxyethoxyl)ethyl ester (IRGACURE 754: manufactured by BASF AG), phenylglyoxylic acid methyl ester (DAROCUR MBF: manufactured by BASF AG), ethyl-4-dimethylaminobenzoate (DAROCUR EDB: manufactured by BASF AG), 2-ethylhexyl-4-dimethylaminobenzoate (DAROCUR EHA: manufactured by BASF AG), bis(2,6-dimethoxybenzoyl)-2,4,4-trimethyl-pentylphosphine oxide (CGI 403: manufactured by BASF AG), benzoyl peroxide, and cumene peroxide.

The initiators (C) may be used singly, or two or more may be used in combination.

The composition of the invention includes a silane compound (D). The compound (D) serves to improve the adhesion and bonding properties of cured products with respect to substrates.

An aliphatic unsaturated group-containing silane compound may be used as the component (D). The aliphatic unsaturated group-containing silane compound is involved in the UV curing reaction and is incorporated into the matrix of the cured product. As a result, effects such as controlling of properties may be expected. Examples of the aliphatic unsaturated groups include the aliphatic unsaturated groups mentioned with respect to (B1), specifically, alkenyl groups such as C2 to C6 alkenyl groups (for example, vinyl, propenyl, butenyl and hexenyl). Alkenyl groups having unsaturated terminals are more preferable. For reasons such as easy synthesis, vinyl groups are preferable.

Examples of the aliphatic unsaturated group-containing silane compounds include 3-methacryloxypropyltriethoxysilane, 3-methacryloxypropyltrimethoxysilane, vinyltrimethoxysilane, vinyltriethoxysilane, bis(trimethoxysilylpropyl)allyl isocyanurate and trimethoxysilylpropyldiallyl isocyanurate, with 3-methacryloxypropyltriethoxysilane and 3-methacryloxypropyltrimethoxysilane being preferable.

Examples of other types of the silane compounds include 3-aminopropyltriethoxysilane, 3-aminopropyltrimethoxysilane, 3-mercaptopropyltriethoxysilane, 3-mercaptopropyltrimethoxysilane, 3-glycidoxypropyltriethoxysilane, 3-glycidoxypropyltrimethoxysilane, tetraethoxysilane, tetramethoxysilane and tris(trimethoxysilylpropyl) isocyanurate.

The compounds (D) may be used singly, or two or more may be used in combination.

The composition of the invention includes (E) an MQ resin having a weight average molecular weight of 2,000 to 2,500,000 (hereinafter, also written simply as "MQ resin") and/or an MDQ resin having a weight average molecular weight of 2,000 to 1,000,000 (hereinafter, also written simply as "MDQ resin"). The addition of the component (E) provides a viscosity suited for the formation of dams, and also increases tackiness (thixotropy). The present composition has a high viscosity of 20,000 cP or more. Thus, there is a general concern that wetting properties are low and cured products exhibit poor adhesion. However, the composition of the invention can give cured products exhibiting good adhesion. It is understood that this effect is contributed to by the addition of the component (E).

The MQ resins are resins including $(R^a)_3SiO_{1/2}$ units (wherein $R^a$s may be alkyl groups or aryl groups, preferably alkyl groups due to availability, easy synthesis and economic efficiency, and particularly preferably methyl groups from the viewpoint of tackiness) and $SiO_2$ units. Examples thereof include resins including $(CH_3)_3SiO_{1/2}$ units and $SiO_2$ units. Preferably, the ratio of the number of the $(R^a)_3SiO_{1/2}$ units to the number of the $SiO_2$ units is 1:99 to 70:30, and more preferably 5:95 to 50:50. The weight average molecular weight of the MQ resins (E) is 2,000 to 2,500,000. In the specification, the weight average molecular weight is a value measured by gel permeation chromatography (GPC) using a polystyrene calibration curve.

From the viewpoint of workability, the MQ resin is preferably used after being diluted with an organic solvent. Examples of the organic solvents include aromatic organic solvents such as toluene and xylene. The MQ resin is preferably such that a 40 wt % solution thereof in xylene or toluene (for example, a xylene or toluene solution having a nonvolatile content of 55 to 65 mass %) has a viscosity of not less than 10 cP, and more preferably not less than 15 cP. The upper limit of the viscosity of the solution may be set appropriately, and may be set at, for example, 100 cP. The viscosity is a value measured on a rotational viscometer (Vismetron VDA-L) (manufactured by Shibaura System) with the rotor No. 1 at 60 rpm.

From the viewpoint of effects on stretchability (the elongation of cured products) and thixotropy, MQ resins having a weight average molecular weight of 1,000,000 to 2,500,000 are preferable, and MQ resins having a weight average molecular weight of 1,500,000 to 2,500,000 are more preferable.

In view of the adjustment of viscosity which affects dischargeability, MQ resins having a weight average molecular weight of 2,000 to less than 1,000,000 are preferable, and MQ resins having a weight average molecular weight of 2,000 to 200,000 are more preferable.

The MDQ resins are resins including $(R^a)_3SiO_{1/2}$ units (wherein $R^a$ groups may be alkyl groups or aryl groups, preferably alkyl groups due to availability, easy synthesis and economic efficiency, and particularly preferably methyl groups from the viewpoint of tackiness), $(R^b)_2SiO$ units (wherein $R^b$ groups may be alkyl groups or aryl groups, preferably alkyl groups due to availability, easy synthesis and economic efficiency, and particularly preferably methyl groups) and $SiO_2$ units. Examples thereof include resins including $(CH_3)_3SiO_{1/2}$ units, $(CH_3)_2SiO$ units and $SiO_2$ units. The ratio of the $(R^a)_3SiO_{1/2}$ units, the $(R^b)_2SiO$ units and the $SiO_2$ units may be adjusted appropriately in accordance with desired refractive index. The weight average molecular weight of the MDQ resins (E) is 2,000 to 1,000,000.

From the viewpoint of the adjustment of refractive index for the improvement in joint performance, MDQ resins having a weight average molecular weight of 5,000 to 1,000,000 are preferable, and MDQ resins having a weight average molecular weight of 10,000 to 1,000,000 are more preferable.

The MQ resins and the MDQ resins may be used singly, or two or more may be used in combination. From the viewpoints of tackiness and thixotropy, the MQ resins are preferable, and it is preferable that the MQ resin represents not less than 20% by weight, more preferably not less than 30% by weight, and still more preferably 40% by weight of the component (E). The proportion of the MQ resin may be 100% by weight.

From the viewpoint of shape retention, it is preferable that an MQ resin having a weight average molecular weight of 1,000,000 to 2,500,000 (and preferably 1,500,000 to 2,500,000) represents not less than 20% by weight, more preferably not less than 30% by weight, and still more preferably 40% by weight of the component (E). The proportion of such an MQ resin may be 100% by weight.

From the viewpoint of workability, an MQ resin having a weight average molecular weight of 2,000 to less than 1,000,000 (and preferably 2,000 to 200,000) may be blended to an MQ resin having a weight average molecular weight of 1,000,000 to 2,500,000 (and preferably 1,500,000 to 2,500,000). In order to achieve dischargeability efficiently, it is preferable that such an MQ resin represents 5 to 50% by weight, and more preferably 10 to 50% by weight of the component (E).

From the viewpoint of adjusting the refractive index, an MQ resin and an MDQ resin may be used in combination. When, for example, the refractive index is approximately 1.43, the weight ratio of the MQ resin to the MDQ resin may be 80:20 to 5:95, and preferably 80:20 to 20:80. This ratio may be altered appropriately in accordance with the refractive indexes of the respective resins and the refractive indexes of other components such as the component (A). From the viewpoint of joint performance, it is preferable to add an MDQ resin to an MQ resin having a weight average molecular weight of 1,000,000 to 2,500,000 (and preferably 1,500,000 to 2,500,000).

In order for cured products to have appropriate hardness and elasticity, the ratio of HS to ViB, (HS/ViB), is 0.5 to 3.0, preferably 0.5 to 2.50, and still more preferably 0.5 to 2.0 wherein HS is the number of the mercaptoalkyl groups bonded to silicon atoms in (A), and ViB is the number of the aliphatic unsaturated groups in (B). When the polyorganosiloxane (B) includes the component (B1) alone, the number of the aliphatic unsaturated groups in (B) is equal to the number of the aliphatic unsaturated groups in (B1), namely, ViB1. When the polyorganosiloxanes (B1) and (B2) are used in combination, the number of the aliphatic unsaturated groups in (B) is the total of the number of the aliphatic unsaturated groups in (B1), namely, ViB1, and the number of the aliphatic unsaturated groups in (B2), namely, ViB2.

When an aliphatic unsaturated group-containing silane compound is used as the component (D), the ratio of HS to ViD, (HS/ViD), may be 0.80 to 3, and preferably 1.0 to 2.5 in order to further enhance adhesion and to further suppress temperature changes of cured products. When an aliphatic unsaturated group-containing silane compound is used as the component (D), the ratio of HS to the total of ViB and ViD, (HS/(ViB+ViD)), is preferably 0.5 to 1.0.

From the viewpoints of photoreaction initiation action, heat resistance during curing, and viewability (high transmittance and low fogging properties), the amount of (C) is preferably 0.05 to 50 parts by weight, and more preferably 0.1 to 40 parts by weight per 100 parts by weight of (B).

The component (E) may be used in an amount of 5 to 400 parts by weight per 100 parts by weight of (B). To improve viscosity, thixotropy and adhesion with respect to substrates, the amount of (E) is preferably 10 to 300 parts by weight, more preferably 20 to 250 parts by weight, and still more preferably 30 to 200 parts by weight.

From the viewpoints of deformation resistance and viewability, the total amount of (A) to (E) is preferably not less than 55% by weight, more preferably not less than 75% by weight, and still more preferably not less than 90% by weight of the composition.

The composition of the invention may contain additives such as silane coupling agents (except the components (D)), silicone resin-based adhesion improvers (except the components (E)), polymerization inhibitors, antioxidants, UV absorbers as light resistance improvers, light stabilizers and inorganic fillers while still achieving the advantageous effects of the invention. The composition of the invention may contain an aliphatic unsaturated group-containing polyorganosiloxane (for example, an aliphatic unsaturated group-containing branched polyorganosiloxane) other than the components (B) without impairing the advantageous effects of the invention; however, the present composition is preferably free from such additional polyorganosiloxanes.

Examples of the silane coupling agents include 3-aminopropyltriethoxysilane, 3-aminopropyltrimethoxysilane, 3-mercaptopropyltriethoxysilane, 3-mercaptopropyltrimethoxysilane, 3-glycidoxypropyltrimethoxysilane, 3-glycidoxypropyltriethoxysilane, trimethoxysilylpropyldiallyl isocyanurate, bis(trimethoxysilylpropyl)allyl isocyanurate, tris(trimethoxysilylpropyl) isocyanurate, triethoxysilylpropyldiallyl isocyanurate, bis(triethoxysilylpropyl)allyl isocyanurate and tris(triethoxysilylpropyl) isocyanurate.

Examples of the polymerization inhibitors include hydroquinone, p-methoxyphenol, t-butylcatechol and phenothiazine.

The antioxidants may be used to prevent the oxidation of cured products of the composition and improve weather resistance. Examples include hindered amine or hindered phenol antioxidants. Examples of the hindered amine antioxidants include, but are not limited to, N,N',N'',N'''-tetrakis-(4,6-bis(butyl-(N-methyl-2,2,6,6-tetramethylpiperidin-4-yl)amino)-triazin-2-yl)-4,7-diazadecane-1,10-diamine, dibutylamine•1,3,5-triazine•N,N'-bis-(2,2,6,6-tetramethyl-4-piperidyl-1,6-hexamethylenediamine•N-(2,2,6,6-tetramethyl-4-piperidyl)butylamine polycondensate, poly[{6-(1,1,3,3-tetramethylbutyl)amino-1,3,5-triazine-2,4-diyl}{(2,2,6,6-tetramethyl-4-piperidyl)imino}hexamethylene {(2,2,6,6-tetramethyl-4-piperidyl)imino}], polymer of dimethyl succinate and 4-hydroxy-2,2,6,6-tetramethyl-1-piperidinethanol, [reaction product of bis(2,2,6,6-tetramethyl-1(octyloxy)-4-piperidyl) decanedioate, 1,1-dimethylethylhydroperoxide and octane (70%)]-polypropylene (30%), bis(1,2,2,6,6-pentamethyl-4-piperidyl)[[3,5-bis(1,1-dimethylethyl)-4-hydroxyphenyl]methyl]butyl malonate, methyl 1,2,2,6,6-pentamethyl-4-piperidyl sebacate, bis(2,2,6,6-tetramethyl-4-piperidyl) sebacate, bis(1,2,2,6,6-pentamethyl-4-piperidyl) sebacate, 1-[2-[3-(3,5-di-tert-butyl-4-hydroxyphenyl)propionyloxy] ethyl]-4-[3-(3,5-di-tert-butyl-4-hydroxyphenyl)propionyloxy]-2,2,6,6-tetramethylpiperidine, 4-benzoyloxy-2,2,6,6-tetramethylpiperidine, and 8-acetyl-3-dodecyl-7,7,9,9-tetramethyl-1,3,8-triazaspiro[4.5]decane-2,4-dione.

Examples of the hindered phenol antioxidants include, but are not limited to, pentaerythritol-tetrakis[3-(3,5-di-tert-butyl-4-hydroxyphenyl)propionate], thiodiethylene-bis[3-(3,5-di-tert-butyl-4-hydroxyphenyl)propionate], octadecyl-3-(3,5-di-tert-butyl-4-hydroxyphenyl)propionate), N,N'-hexane-1,6-diylbis[3-(3,5-di-tert-butyl-4-hydroxyphenylpropioamide), 3,5-bis(1,1-dimethylethyl)-4-hydroxy C7-C9 side chain alkyl benzenepropanoate, 2,4-dimethyl-6-(1-methylpentadecyl)phenol, diethyl[[3,5-bis(1,1-dimethylethyl)-4-hydroxyphenyl]methyl]phosphonate, 3,3',3'',5,5',5''-hexane-tert-butyl-4-a,a',a''-(mesitylene-2,4,6-tolyl)tri-p-cresol, calcium diethylbis[[[3,5-bis-(1,1-dimethylethyl)-4-hydroxyphenyl]methyl]phosphonate], 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H,3H,5H)-trione, reaction product of N-phenylbenzeneamine and 2,4,4-trimethylpentene, and 2,6-di-tert-butyl-4-(4,6-bis(octylthio)-1,3,5-triazin-2-ylamino) phenol. The antioxidants may be used singly, or two or more may be used in combination.

The light stabilizers may be used to prevent the photooxidative degradation of cured products, and examples thereof include benzotriazole compounds, hindered amine compounds and benzoate compounds. The UV absorbers as light resistance improvers may be used to prevent light degradation and to improve weather resistance, and examples thereof include UV absorbers such as benzotriazole compounds, triazine compounds, benzophenone compounds and benzoate compounds. Examples of the UV absorbers include, but are not limited to, benzotriazole UV absorbers such as 2,4-di-tert-butyl-6-(5-chlorobenzotriazol-2-yl)phenol, 2-(2H-benzotriazol-2-yl)-4,6-di-tert-pentylphenol, 2-(2H-benzotriazol-2-yl)-4-(1,1,3,3-tetramethylbutyl)phenol, methyl 3-(3-(2H-benzotriazol-2-yl)-5-tert-butyl-4-hydroxyphenyl) propionate/polyethylene glycol 300 reaction product, and 2-(2H-benzotriazol-2-yl)-6-(linear and side chain dodecyl)-4-methylphenol; triazine UV absorbers such as 2-(4,6-diphenyl-1,3,5-triazin-2-yl)-5-[(hexyl)oxy]-phenol; benzophenone UV absorbers such as octabenzone; and benzoate UV absorbers such as 2,4-di-tert-butylphenyl-3,5-di-tert-butyl-4-hydroxybenzoate. The UV absorbers may be used singly, or two or more may be used in combination. Of the light stabilizers, hindered amine compounds are preferable. In particular, tertiary amine-containing hindered amine light stabilizers are preferably used to improve the storage stability of the composition. Examples of the tertiary amine-containing hindered amine light stabilizers include such light stabilizers as Tinuvin 622LD, Tinuvin 144 and CHIMASSORB119FL (all manufactured by BASF AG); MARK LA-57, LA-62, LA-67 and LA-63 (all manufactured by ADEKA CORPORATION); and SANOL LS-765, LS-292, LS-2626, LS-1114 and LS-744 (all manufactured by SANKYO CO., LTD.).

In order to ensure that the composition retains shape during discharging in the dam formation, the viscosity of the present composition at 23° C. is 20,000 to 150,000 cP. Here, the viscosity is a value measured at a rotational speed of 6 rpm. From the viewpoint of shape retention, the lower limit is preferably 23,000 cP, and more preferably 25,000 cP. From the viewpoints of workability and dischargeability, the upper limit is preferably 130,000 cP, and more preferably 100,000 cP.

In the present composition, it is preferable that the thixotropic ratio $V_{6rpm}/V_{12rpm}$ be 1.02 to 1.9 wherein $V_{6rpm}$ and $V_{12rpm}$ are values of the viscosity (cP) measured at 23° C. and a rotational speed of 6 rpm, and at 23° C. and a rotational speed of 12 rpm, respectively. With the thixotropic ratio being in this range, the viscosity has little influence on dischargeability and the composition advantageously exhibits excellent workability and good shape retention. The thixotropic ratio is more preferably 1.03 to 1.7, and still more preferably 1.04 to 1.5.

The composition of the invention may be prepared by blending the components (A) to (E) and additives. The composition is preferably prepared in such a manner that the components (A), (B) and (E) are blended together, and the components (C) and (D) and an optional polymerization inhibitor are blended to the blend in the absence of UV rays. For example, the composition may be obtained in such a manner that the components (B) and (E) are added to a universal mixing stirrer and are mixed together at room temperature (10 to 30° C.) and low speed to give a uniform mixture; the mixture is homogeneously mixed at 130° C. under reduced pressure and is cooled; the component (A) is added and the mixture is heated to about 90 to 130° C., homogeneously mixed under reduced pressure, and cooled; thereafter the components (C) and (D) and the additives such as a polymerization inhibitor are added in the absence of UV rays; and the mixture is homogeneously mixed at low speed under reduced pressure while performing ice water cooling (10° C. or below), followed by deforming and optionally filtration.

The composition of the invention may be cured by the application of UV rays. Examples of lamps having a wavelength region which can induce the reaction of (C) include high-pressure mercury lamps (UV-7000) and metal halide lamps (MHL-250, MHL-450, MHL-150, MHL-70) manufactured by USHIO INC.; metal halide lamps (JM-MTL 2KW) manufactured by JM tech Co. Ltd., South Korea; UV illumination lamps (OSBL 360) manufactured by Mitsubishi Electric Corporation; UV illuminators (UD-20-2) manufactured by Japan Storage Battery Co., Ltd.; fluorescent lamps (FL-20BLB) manufactured by Toshiba Corporation; and H valves, H plus valves, D valves, Q valves and M valves manufactured by Fusion Co. The irradiation dose is preferably 100 to 10000 mJ/cm$^2$, more preferably 300 to 5000 mJ/cm$^2$, and still more preferably 500 to 3500 mJ/cm$^2$.

Cured products of the present composition have the following advantageous properties.

[Transmittance to Visible Light after Curing]

The composition of the invention is advantageous in terms of viewability because the transmittance to visible light after the composition is cured with a cured thickness of 150 μm may be as high as 95% or more. The visible light transmittance is more preferably 96% or more, and still more preferably 98% or more. From the viewpoint of transmittance to visible light, it is preferable that the amount of (C) be small. The transmittance to visible light after curing may be enhanced by heat treating the components (A) and (B) individually or in the form of a homogenous mixture at 80 to 180° C. Such heat treatment is also preferable from the viewpoint of aging stability.

[Cure Shrinkage Rate]

The composition of the invention advantageously exhibits a cure shrinkage rate of 1.0% or less. Thus, the composition may be advantageously applied to, for example, image displays to make it possible to prevent distortion easily and to ensure viewability. The cure shrinkage rate is preferably 0.5% or less, more preferably 0.3% or less, and still more preferably 0.2% or less.

[E Hardness after Curing]

The composition of the invention may give cured products having an E hardness of 5 to 40. When the composition is applied to image displays, the cured products may appropriately relax external stress easily and may ensure viewability by preventing the penetration of water even under hot and humid conditions. The E hardness is preferably 5 to 35 and more preferably 10 to 30.

[Elongation after Curing]

The composition of the invention may give cured products having an elongation of 50% or more. Thus, external stress may be excellently relaxed and good deformation resistance may be ensured. The elongation after curing is preferably 80% or more, more preferably 100% or more, and still more preferably 200% or more.

The composition of the invention is a dam composition for use in image displays. The dam composition is used to form a frame on a display component or a protective component of an image display. The frame prevents a sealant that is applied inside the frame from being squeezed out of the component such as the display component. For example, the composition may be applied onto a liquid crystal panel along the edge through a discharging nozzle of a dispenser (the nozzle may be selected appropriately in accordance with the discharging amount, for example, 23 G), and thereafter a filler material may be applied and a cover panel may be laminated onto the liquid crystal panel. In this manner, the filler may be prevented from being squeezed out to the backside of the liquid crystal panel, and the contamination of surrounding areas may be avoided. The present composition exhibits good adhesion, and may be suitably applied to any of display components and protective components.

The composition of the invention is suited for the manufacturing of large-screen image displays having an image display panel size of 5 to 100 inches, more preferably 7 to 80 inches, and still more preferably 10 to 60 inches.

The use of the present composition is advantageous when the sealant disposed between a protective component and an image display component of an image display is a UV curable resin composition, and more advantageously a UV curable silicone resin composition. The UV curable silicone resin compositions used as the sealants may be compositions described in WO 2012/086402. Specifically, examples of such sealants include UV curable silicone resin compositions including:

(A') a polyorganosiloxane having a mercaptoalkyl group bonded to a silicon atom, the polyorganosiloxane (A') having a viscosity at 23° C. of 20 to 25000 cP;

(B') an aliphatic unsaturated group-containing polyorganosiloxane, the polyorganosiloxane (B') including an aliphatic unsaturated group-containing linear polyorganosiloxane (B1') represented by Formula (I'):

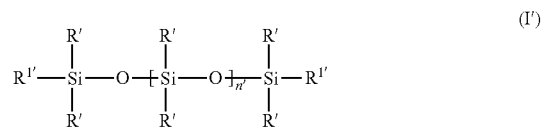

(in the formula:

each R$^{1\prime}$ group is independently an aliphatic unsaturated group, each R' group is independently a C1 to C6 alkyl group or a C6 to C12 aryl group, and 1 to 60 mol % of the total R' groups are C6 to C12 aryl groups, and the letter n' is a value such that the viscosity at 23° C. becomes 100 to 25000 cP, and preferably 100 to 8000 cP), and a branched polyorganosiloxane (B2') having $SiO_{4/2}$ units, $R''_3SiO_{1/2}$ units and $R''_2SiO_{2/2}$ units, and optionally further having $R''SiO_{3/2}$ units (in the formulae, each of R'' is independently a C1 to C6 alkyl group or an aliphatic unsaturated group), at least three R'' groups per molecule of the branched polyorganosiloxane (B2') are aliphatic unsaturated groups (the proportion of the number of the aliphatic unsaturated groups in (B2') is 50% or less of the total number of the aliphatic unsaturated groups in (B'));

(C') a photoreaction initiator; and (D') an aliphatic unsaturated group-containing silane compound.

Here, the ratio of the number of the mercaptoalkyl groups present in (A') to the total number of the aliphatic unsaturated groups in (B') and (D') is 0.5 to 1.05;

the ratio of the number of the mercaptoalkyl groups in (A') to the number of the aliphatic unsaturated groups in (B') is 0.95 to 3; and the ratio of the number of the mercaptoalkyl groups in (A') to the number of the aliphatic unsaturated groups in (D') is 1.5 to 3.

EXAMPLES

Hereinbelow, the present invention will be described in further detail by presenting Examples and Comparative Examples. Unless otherwise mentioned, part(s) and % indicate part(s) by weight and % by weight. The scope of the invention is not limited to such Examples. The curing of compositions prepared in Examples and Comparative Examples was performed with UVL-4001M manufactured by USHIO INC. at 120 W/cm² and, unless otherwise mentioned, with the maximum energy irradiation dose obtained in a curability test (measured with actinometer UIT-250 manufactured by USHIO INC.). The maximum energy irradiation dose was the dose at which the E hardness of the cured product was no longer changed, or was 8000 or 9000 mJ/cm². The dose at which the E hardness of the cured product was no longer changed was the larger dose in two successive irradiations which resulted in the same value of E hardness when the composition was cured while increasing the irradiation dose in steps of 1000 mJ/cm².

[Property Evaluation Conditions]

(1) Measurement of Number of Mercapto Groups

A ¹⁄₁₀ N iodine solution (a special grade reagent) was used as an iodine source, and the number of mercapto groups per unit weight was determined by colorimetric titration.

Calculation method: SH content (mmol/g)=$(A \times P \times 0.1)/(W \times C)$

A: The amount of the iodine solution dropped until color change.

P: The factor of the iodine solution (The factor described on the reagent): described when correction was necessary.

W: The weight (g) of the sample.

C: The nonvolatile content in the sample.

A preliminary measurement was performed to determine the amount of the iodine solution dropped. Thereafter, the measurement was carried out accurately three times, and the results of the three measurements were averaged.

(2) Measurement of Number of Aliphatic Unsaturated Groups

Assuming that the peaks assigned to $Si-CH_3$ (near 0.1 ppm), Si-Ph (near 7.3-7.7 ppm) and $CH_3Si-CH=CH_2$ (near 5.7-6.3 ppm) in NMR measurement corresponded to the $(CH_3)_2SiO$ units, $Ph_2$-SiO units and $(CH_3)_2Si-CH=CH_2O_{1/2}$ units, respectively, the numbers of these units were obtained from the ratio of the respective peak intensities, thereby obtaining an average structural formula. From the formula, the molecular weight was obtained and the number of the unsaturated groups was calculated.

(3) Viscosity and Thixotropy

With use of a rotational viscometer (Vismetron VDA-L) (manufactured by Shibaura System), the viscosity at 23° C. was measured with a prescribed rotational speed using the rotor No. 2 in the range of 400 cP or less, the rotor No. 3 in the range of above 400 to 1500 cP, and the rotor No. 4 in the range of above 1500 cP. Thixotropy was obtained from the ratio $V_{6rpm}/V_{12rpm}$, wherein $V_{6rpm}$ and $V_{12rpm}$ were values of the viscosity at a rotational speed of 6 rpm and a rotational speed of 12 rpm, respectively.

(4) Dischargeability

The composition was discharged through a double thread screwed plastic needle (manufactured by Musashi Engineering, Inc.: needle length: 12.7 mm, gauge: 20 G (inner diameter 0.58 mm, outer diameter 0.91 mm)). The weight (g) discharged in 10 seconds was obtained to evaluate dischargeability.

(5) Visible Light Transmittance

For liquid products, the samples were packed in a quartz cell to a thickness of 10 mm. For cured products, the samples were adjusted to a thickness of 150 µm. The transmittance to visible light wavelengths (360 to 780 nm) was measured at 23° C. with a spectrophotometer (CM-3500d manufactured by Minolta Co., Ltd.).

(6) Cure Shrinkage Rate

The specific gravity of the composition was measured before and after curing with an electronic gravimeter (SD-120L manufactured by MIRAGE). The cure shrinkage was calculated based on the difference in specific gravity from the following equation.

Cure shrinkage rate (%)=(Specific gravity after curing−Specific gravity before curing)/Specific gravity after curing)×100

(7) E Hardness after Curing

The composition was cured with various energy irradiation doses. In accordance with JIS K 6253 E, the E hardness of the cured products was measured at 23° C. with DUROMETER HARDNESS TYPE E (manufactured by ASKER). The E hardness of the cured product cured with the maximum energy irradiation dose was adopted as the E hardness after curing.

(8) Elongation after Curing

In accordance with JIS K 6301, the elongation of the cured product cured with the maximum energy irradiation dose was measured at 23° C. using a Schopper tensile tester (manufactured by Toyo Seiki Seisaku-Sho Ltd.).

(9) Indentation Test

The composition was applied between a 0.6 mm thick glass plate for 3.5 inch display (image display component with 3.5 inch diagonal length) and a 0.4 mm thick PMMA plate for 3.5 inch display (image display component with 3.5 inch diagonal length), the thickness of the composition being 200 µm. The composition was cured by the application of UV ray energy at a dose of 5000 mJ/cm², thereby preparing a sample.

After 24 hours after the UV application, a metal rod having a semispherical end with a diameter of 10 mm was pressed against a central portion of the sample on the PMMA (polymethyl methacrylate) plate side at a rate of 7.5 mm/min until a prescribed load was reached.

When this pressurization caused fine cracks in the pressed portion of the glass plate, the PMMA plate or the cured composition, the appearance of the pressed portion was changed compared to the other region because of the presence of the cracks or white discoloration. Any such changes in appearance were visually inspected for.

The sample was evaluated as x when any changes in the appearance of the pressed portion were observed.

The sample was evaluated as ○ when the pressed portion was free from appearance changes.

(10) Crack Resistance and Discoloration (10-1) Heat Shock

The composition was applied onto the entire surface of a 1 mm thick glass plate, and a 1 mm thick PMMA plate was placed thereon, the thickness of the composition being 200 μm. The composition was then cured by the application of UV ray energy at a dose of 5000 mJ/cm$^2$, and an environmental test was carried out with temperature cycles of from −50° C. to 125° C. (held at each temperature for 30 minutes) (apparatus: TSA-71 S-A manufactured by ESPEC CORP.).

Thereafter, the sample was brought back to 23° C., and the conditions of the cured product, the PMMA and the glass were observed with an optical microscope (×10 magnification).

The heat shock properties were evaluated as NG when the cured product had a crack extending 0.02 mm or more in one direction and/or an air layer extending 0.02 mm or more in one direction, and/or when any of the PMMA and the glass had a damage extending 0.02 mm or more in one direction.

The heat shock properties were evaluated as OK when the sample was free from these crack, air layer and damage.

(10-2) Testing Under Hot and Humid Conditions

The cured product was allowed to stand for 500 hours in a constant temperature and humidity chamber set at high temperature and high humidity conditions with a temperature of 85° C. and a humidity of 85% RH. Thereafter, the cured product was brought back to a temperature of 23° C. and a humidity of 50%, and discoloration was evaluated by measuring a yellow index, an indicator of the degree of discoloration, with a spectrophotometer (CM-3500d manufactured by Minolta Co., Ltd.).

Discoloration was evaluated as NG when the yellow index was 1.0% or more. Discoloration was evaluated as OK when the yellow index was less than 1.0%.

(11) Cohesive Failure Rate (11-1) With Acrylics and Glass

On each of adherends (PMMA and glass) having a width of 25 mm, the composition was applied in a thickness of 0.1 mm over a width of 25 mm and a length of at least 10 mm. Reinforced glass plates with a thickness of 2 mm and a width of 25 mm were placed on the composition in such a manner that the reinforced glass plate sat on a 10 mm long portion of the composition. Thereafter, the composition was cured by the application of UV ray energy at a dose of 3000 mJ/cm$^2$, thereby preparing samples.

Immediately after the preparation of samples, and after 1 day and 3 days after the preparation of samples, the samples were subjected to a shear adhesion test in which the adherend and the glass plate were separated by the pulling at a cross head speed of 10 mm/min with use of an autograph manufactured by Shimadzu Corporation.

The area S mm$^2$ of the fractured portion of the composition on the adherend was measured, and the cohesive failure rate (%) was calculated from:

$$(100 \times S)/(10 \times 25).$$

(11-2) With Polarizing Plates

Polarizing plate films were provided which included liquid crystal polarizing films having a width of 25 mm (product name: SEG1425DU manufactured by Nitto Denko Corporation), anti-glare treated films (product name: AG150 manufactured by Nitto Denko Corporation), and anti-reflection treated films (product name: ARS Type manufactured by Nitto Denko Corporation). To each of the polarizing films, the composition was applied in a thickness of 0.1 mm over a width of 25 mm and a length of at least 60 mm. Reinforced glass plates with a thickness of 2 mm and a width of 25 mm were placed on the composition in such a manner that the reinforced glass plate sat on a 10 mm long portion of the composition. Thereafter, the composition was cured by the application of UV ray energy at a dose of 3000 mJ/cm$^2$, thereby preparing samples. Immediately after the preparation of samples, and after 2 hours after the preparation of samples, the samples were subjected to a bond peel test in which the adherend, namely, the polarizing film was peeled at 180° from the glass plate by the pulling at a cross head speed of 10 mm/min with use of an autograph manufactured by Shimadzu Corporation.

The area S mm$^2$ of the fractured portion of the composition on the adherend was measured, and the cohesive failure rate (%) was calculated from:

$$(100 \times S)/(10 \times 25).$$

(11-3) With Aluminum and Stainless Steel

On each of adherends (aluminum and stainless steel (SUS304)) having a width of 25 mm, the composition was applied in a thickness of 0.1 mm over a width of 25 mm and a length of at least 10 mm. Reinforced glass plates with a thickness of 2 mm and a width of 25 mm were placed on the composition in such a manner that the reinforced glass plate sat on a 10 mm long portion of the composition. Thereafter, the composition was cured by the application of UV ray energy at a dose of 3000 mJ/cm$^2$ through the glass, thereby preparing samples.

Immediately after the preparation of samples, and after 1 day and 3 days after the preparation of samples, the samples were subjected to a shear adhesion test in which the adherend and the glass plate were separated by the pulling at a cross head speed of 10 mm/min with use of an autograph manufactured by Shimadzu Corporation.

The area S mm$^2$ of the fractured portion of the composition on the adherend was measured, and the cohesive failure rate relative to the coating area was calculated.

(12) Haze

A cured product was stored at a temperature of 85° C. and a humidity of 85% for 500 hours. Thereafter, the cured product was brought back to 23° C. and a humidity of 50%, and was tested with haze meter NDH5000 (manufactured by NIPPON DENSHOKU INDUSTRIES CO., LTD.) in accordance with JIS K 7105.

(13) Joint Performance

On a slide glass (S1112) manufactured by Matsunami Glass Ind., Ltd., the composition (the dam material) was applied in the form of a 75 mm×25 mm frame with a thickness of 200 μm and a width of 0.3 mm, and was cured by the application of UV ray energy at a dose of 2000 mJ/cm$^2$. A filler material (a filler) was applied inside the frame, and another slide glass (S1112) manufactured by Matsunami Glass Ind., Ltd. was placed thereon. The filler was similarly cured by the application of UV ray energy at a dose of 3000 mJ/cm². The joint was visually observed to evaluate viewability.

⊚: The joint was invisible with the naked eye.

○: The joint was almost invisible with the naked eye.

○-Δ: The joint was hardly visible with the naked eye.

Δ: The joint was visible with the naked eye.

Δ-x: The joint was easily visible with the naked eye.

x: The joint was very clear.

Here, the filler material was prepared as follows. The details of (a-1), (c-1), (c-2), (d-1) and (e-1) will be described later.

8.5 Parts by weight of (a-1), 79.76 parts by weight of a vinyl-terminated polymethylphenylsiloxane (viscosity 3000 cP) which had dimethylvinylsiloxy-blocked terminals and contained 5 mol % of diphenylsiloxy units and the balance of dimethylsiloxy units, and 10 parts by weight of (e-1) were mixed together homogeneously. Thereafter, 0.22 parts by weight of (c-1), 0.22 parts by weight of (c-2) and 1.3 parts by weight of (d-1) were added. The resultant mixture was mixed to uniformity to give a filler material.

(14) Temperature Cycle Adhesion Test

Onto the surface of a glass plate (1 mm thickness, 137 mm×102 mm), the composition (the dam material) was applied in the form of a 135 mm×100 mm frame with a thickness of 200 μm and a width of 0.3 mm with use of a double thread screwed plastic needle (manufactured by Musashi Engineering, Inc.: needle length: 12.7 mm, gauge: 23 G (inner diameter 0.33 mm, outer diameter 0.64 mm)). The filler material (the filler) was applied inside the frame with a dispenser (2300N series) manufactured by SAN-EI-TECH Ltd. A PMMA plate (1 mm thickness, 157 mm×110 mm) was placed thereon, and the materials were cured by the application of UV ray energy at a dose of 5000 mJ/cm². After being allowed to stand at 23° C. for 1 hour, the sample was heated to 85° C., allowed to stand at the temperature for 6 hours, and brought back to 23° C. This cycle was repeated three times (apparatus: Bench-Top Environmental Test Chamber SU-661 manufactured by ESPEC CORP.).

After the completion of each cycle, the conditions of the cured product, the PMMA and the glass returned to 23° C. were observed with an optical microscope (×10 magnification).

The temperature cycle adhesion was evaluated as "Crack" when the cured product, the PPMA and the glass were free from separation but the cured product had a crack.

The temperature cycle adhesion was evaluated as "Sep. (separation)" when any separation had occurred between the cured product and at least one of the PMMA and the glass.

(15) Thixotropic Ratio and Comparison of Shapes after Discharging

A prescribed amount of the composition was supplied onto the center of 5 cm square glass, and the degree of spreading after a prescribed time was measured with a digital caliper (NTD12 manufactured by Mitsutoyo Corporation).

The composition was supplied through double thread screwed plastic needles (manufactured by Musashi Engineering, Inc.: needle length: 12.7 mm, gauge: 14 G (inner diameter 1.52 mm, outer diameter 0.91 mm), gauge: 20 G (inner diameter 0.58 mm, outer diameter 0.91 mm)). Diameters immediately after the application and after 1 minute from the application were observed with an electron microscope.

SYNTHETIC EXAMPLES

The components (A) in Examples and Comparative Examples are the following.

Synthesis of (a-1)

A 5 L separable flask equipped with a cooling reflux tube, a dropping funnel and THREE-ONE MOTOR as a stirrer was loaded with 1549.2 g (12 mol) of dimethyldichlorosilane, 21.7 g (0.2 mol) of trimethylchlorosilane, 196.4 g (1.0 mol) of 3-mercaptopropyltrimethoxysilane and 1500 g of toluene. A mixture of 1000 g of water and 500 g of toluene was added dropwise through the dropping funnel over a period of approximately 1 hour. Hydrolysis was performed for 2 hours while stirring the system at 70° C. After the completion of the reaction, the aqueous phase was separated, and the residue was washed with water and dehydrated by being heated at 100° C. to 125° C. After the completion of the dehydration, 1.5 g of a 50% aqueous potassium hydroxide solution was added, and the mixture was stirred for 5 hours while performing heating at 115 to 125° C., thereby performing a condensation reaction. The reaction system was neutralized with ethylene chlorohydrin, and 1200 to 1300 g of toluene was removed. The system was filtered with use of CELITE SUPER FLOSS as a filtration aid. Thereafter, the residual toluene was removed at ambient pressure and reduced pressure. Thus, 928 g of mercaptopropyl group-containing polymethylsiloxane was obtained.

Average Structural Formula:

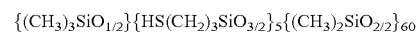

Viscosity: 286 cP

Transmittance through 10 mm thickness: 93.8%

Number of mercapto groups per unit weight: 0.98 mmol/g (a-2) Mercaptopropyl Group-Containing Polymethylsiloxane Average structural formula:

Viscosity: 330 cP

Transmittance through 10 mm thickness: 93.1%

Number of mercapto groups per unit weight: 0.97 mmol/g

Synthesis of (a-3)

A 5 L separable flask equipped with a cooling reflux tube, a dropping funnel and THREE-ONE MOTOR as a stirrer was loaded with 253.2 g (1.0 mol) of diphenyldichlorosilane, 141.5 g (0.48 mol) of triphenylchlorosilane, 406.7 g (3.15 mol) of dimethyldichlorosilane, 98.2 g (0.5 mol) of 3-mercaptopropyltrimethoxysilane and 1000 g of toluene. A mixture of 1000 g of water and 700 g of toluene was added dropwise through the dropping funnel over a period of approximately 1 hour. Hydrolysis was performed for 2 hours while stirring the system at 70° C. After the completion of the reaction, the aqueous phase was separated, and the residue was washed with water and dehydrated by being heated at 100° C. to 125° C. After the completion of the dehydration, 0.5 g of a 50% aqueous potassium hydroxide solution was added, and the mixture was stirred for 5 hours while performing heating at 115 to 125° C., thereby performing a condensation reaction. The reaction system was neutralized with ethylene chlorohytin, and 1300 to 1500 g of toluene was removed. The system was filtered with use of CELITE SUPER FLOSS as a filtration aid. Thereafter, the residual toluene was removed at ambient pressure and reduced pressure. Thus, 511 g of mercaptopropyl group-containing polymethylsiloxane was obtained.

Average structural formula:

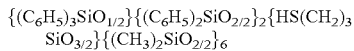

Viscosity: 23000 cP
Transmittance through 10 mm thickness: 82.1%
Number of mercapto groups per unit weight: 0.82 mmol/g
The components (B1) in Examples and Comparative Examples are the following.
Synthesis of (b1-1)
A 3 L separable flask equipped with a cooling reflux tube and THREE-ONE MOTOR as a stirrer was loaded with 1800 g of 1,1,3,3,5,5,7,7-octamethylcyclotetrasiloxane, 260 g of 1,1,3,3,5,5,7,7-octaphenylcyclotetrasiloxane and 7.6 g of 1,1,3,3-tetramethyl-1,3-divinyldisiloxane. The mixture was dehydrated by being stirred and heated at 150 to 160° C. while blowing nitrogen gas at 0.5 Nm³/h for 3 hours. Subsequently, 0.1 g of potassium hydroxide was added, and the mixture was heated and stirred until the potassium hydroxide was dissolved uniformly in the flask and the viscosity was increased to 15000 cP to 18000 cP. Thereafter, the mixture was neutralized with 10 g of ethylene chlorohydrin at 100° C., filtered with use of CELITE SUPER FLOSS as a filtration aid, and subjected to a reduced pressure of 2 mmHg at 170 to 180° C. to remove low-boiling point components. As a result, 1832 g of a vinyl-terminated polymethylphenylsiloxane was obtained which had dimethylvinylsiloxy-blocked terminals and contained 5 mol % of diphenylsiloxy units and the balance of dimethylsiloxy units.
Viscosity: 20450 cP
Average number of aliphatic unsaturated groups per molecule: 2
Average structural formula according to NMR measurement:

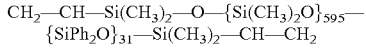

Molecular weight: 50130

Synthesis of (b1-2)

A 3 L separable flask equipped with a cooling reflux tube and THREE-ONE MOTOR as a stirrer was loaded with 1800 g of 1,1,3,3,5,5,7,7-octamethylcyclotetrasiloxane, 260 g of 1,1,3,3,5,5,7,7-octaphenylcyclotetrasiloxane and 7.6 g of 1,1,3,3-tetramethyl-1,3-divinyldisiloxane. The mixture was dehydrated by being stirred and heated at 150 to 160° C. while blowing nitrogen gas at 0.5 Nm³/h for 3 hours. Subsequently, 0.1 g of potassium hydroxide was added, and the mixture was heated and stirred until the potassium hydroxide was dissolved uniformly in the flask and the viscosity was increased to 15000 to 18000 cP. Thereafter, the mixture was neutralized with 10 g of ethylene chlorohydrin at 100° C., filtered with use of CELITE SUPER FLOSS as a filtration aid, and subjected to a reduced pressure of 2 mmHg at 170 to 180° C. to remove low-boiling point components. As a result, 1867 g of a vinyl-terminated polymethylphenylsiloxane was obtained which had dimethylvinylsiloxy-blocked terminals and contained 5 mol % of diphenylsiloxy units and the balance of dimethylsiloxy units.
Viscosity: 19200 cP
Average number of aliphatic unsaturated groups per molecule: 2
Average structural formula according to NMR measurement:

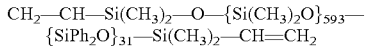

Molecular weight: 49320

(b1-3) Vinyl-Terminated Polymethylphenylsiloxane
Vinyl-terminated polymethylphenylsiloxane having dimethylvinylsiloxy-blocked terminals, and containing 5 mol % of diphenylsiloxy units and the balance of dimethylsiloxy units
Average number of aliphatic unsaturated groups per molecule: 2
Average structural formula according to NMR measurement:

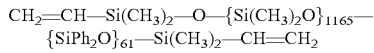

Viscosity: 98600 cP
Molecular weight: 98540
The component (B2) in Examples and Comparative Examples is the following.
(b2-1) $M_6D'Q_8$ resin having an average structural formula:

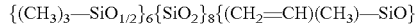

Weight average molecular weight: 22000
The weight average molecular weight is a value measured by gel permeation chromatography (GPC) using a polystyrene calibration curve.
The components (C) in Examples and Comparative Examples are the following.
(c-1) 2-hydroxy-2-methylpropiophenone
(c-2) 2,2-dimethoxy-1,2-diphenylethan-1-one
(c-3) bis(2,4,6-trimethylbenzoyl)phenylphosphine oxide
(c-4) ethyl(2,4,6-trimethylbenzoyl)phenyl phosphinate
The component (D) in Examples and Comparative Examples is the following.
(d-1) 3-methacryloxypropyltrimethoxysilane
The components (E) in Examples and Comparative Examples are the following.
(e-1) MQ resin
MQ resin having an average structural formula:

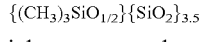

Weight average molecular weight: 26200
The weight average molecular weight is a value measured by gel permeation chromatography (GPC) using a polystyrene calibration curve.
A 3 L separable flask equipped with a cooling reflux tube and THREE-ONE MOTOR as a stirrer was loaded with 293 g of hydrochloric acid. The temperature in the flask was adjusted to −5° C. to 2° C. While performing stirring, 440 g of water was added, and 308 g of water glass No. 3 (S40 sodium silicate No. 3) was added dropwise over a period of 1 hour. Next, 316 g of isopropyl alcohol was added to the flask, and a hydrosol was formed. Thereafter, a mixture of 128 g of trimethylchlorosilane and 139 g of xylene was added dropwise in about 10 minutes, and stirring was performed for 1 hour at a temperature in the flask of −5° C. to 2° C. Next, the temperature was increased to approximately 80° C., and the system was refluxed at 80° C. for 2 hours. Next, 24 g of xylene was added, and the mixture was stirred for 30 minutes and was allowed to stand for 30 minutes. The phases were separated. Thereafter, dehydration and desolvation were carried out at 125 to 140° C., and the nonvolatile content was measured. The amount of nonvolatile components was found to be 58 mass % (viscosity 18 cP, measurement conditions: rotational viscometer: No. 1, 60 rpm). The MQ resin obtained was mixed with the vinyl-terminated polymethylphenylsiloxane used in each of Examples and Comparative Examples, and the mixture was subjected to use after the removal of xylene.

(e-2) MQ resin having an average structural formula:

$\{(CH_3)_3SiO_{1/2}\}\{SiO_2\}_3$

Weight average molecular weight: 1,990,000
Viscosity of 60 mass % solution in xylene: 27 cP (measurement conditions: rotational viscometer: No. 1, 60 rpm)
(e-3)
MDQ resin having an average structural formula:

$\{(CH_3)_3SiO_{1/2}\}\{(CH_3)_2SiO\}_{1.2}\{SiO_2\}_3$

Weight average molecular weight: 52120
Viscosity of 60 mass % solution in xylene: 17 cP (measurement conditions:
rotational viscometer: No. 1, 60 rpm)
The components (F) in Examples and Comparative Examples are the following.
(f-1) p-t-butylcatechol (polymerization inhibitor)
(f-2) p-methoxyphenol (polymerization inhibitor)

Example 1

A 5 L universal mixing stirrer (manufactured by Dalton Co., Ltd.) was loaded with 8.0 parts by weight (80 g) of the mercaptopropyl group-containing polymethylsiloxane (a-2), 46.5 parts by weight (465 g) of the vinyl-terminated polymethylphenylsiloxane (b1-2) and 40.0 parts by weight (400 g) of the MQ resin (e-1). These were mixed with each other homogeneously at room temperature (22° C.) under low-speed lever rotation conditions for 30 minutes. The homogeneous mixture was combined with a solution of 0.004 part by weight (0.04 g) of p-t-butylcatechol (f-1), 0.21 part by weight (2.1 g) of 2-hydroxy-2-methylpropiophenone (c-1) and 0.21 part by weight (2.1 g) of 2,2-dimethoxy-1,2-diphenylethan-1-one (c-2), and further with 1.0 part by weight (10 g) of 3-methacryloxypropyltrimethoxysilane (d-1). The resultant mixture was mixed homogeneously under reduced pressure while performing ice water cooling (8° C.) under low-speed lever rotation conditions for 30 minutes. Thereafter, unwanted substances such as foreign substances were removed through a 10 μm membrane filter, thereby obtaining a composition.

In the same manner as in Example 1, compositions of Examples and Comparative Examples were prepared by following the formulations shown in Table 1, and properties were measured. The results are described in Tables 2 to 4.

TABLE 1

| | Ex. 1 | Comp. Ex 1 | Ex. 2 | Comp. ex 2 | Ex. 3 | Ex. 4 | Comp. Ex 3 | Ex. 5 | Comp. Ex 4 | Ex. 6 | Comp. Ex 5 | Ex. 7 |
|---|---|---|---|---|---|---|---|---|---|---|---|---|
| (a-1) Mercaptopropyl group-containing polymethylsiloxane (286 cP) | | | | | | | | | | | | 8.0 |
| (a-2) Mercaptopropyl group-containing polymethylsiloxane (330 cP) | 8.0 | 5.0 | 8.0 | 5.0 | 8.0 | 8.0 | 6.0 | 8.0 | 8.0 | | | |
| (a-3) Mercaptopropyl group-containing polymethylsiloxane (23000 cP) | | | | | | | | | | 18.0 | 20.0 | |
| (b1-1) Vinyl-terminated polymethylphenylsiloxane (20450 cP) | | | | | | | | | | | | 44.8 |
| (b1-2) Vinyl-terminated polymethylphenylsiloxane (19200 cP) | 46.5 | 53.5 | 46.5 | 53.5 | 46.5 | 46.5 | 52.5 | 46.5 | | | | |
| (b1-3) Vinyl-terminated polymethylphenylsiloxane (98600 cP) | | | | | | | | | 86.5 | 38.5 | 76.5 | |
| (b2-1) $M^6D^vQ_8$ resin | 4.0 | | 4.0 | | 4.0 | 4.0 | | 4.0 | 4.0 | 2.0 | 2.0 | 5.0 |
| (c-1) 2-hydroxy-2-methylpropiophenone | 0.21 | 0.21 | 0.21 | 0.21 | 0.21 | 0.21 | 0.21 | 0.21 | 0.21 | 0.21 | 0.21 | 0.22 |
| (c-2) 2,2-dimethoxy-1,2-diphenylethan-1-one | 0.21 | 0.21 | 0.21 | 0.21 | 0.21 | 0.21 | 0.21 | 0.21 | 0.21 | 0.21 | 0.21 | 0.69 |
| (c-3) Bis(2,4,6-trimethylbenzoyl)-phenylphosphine oxide | | | | | | | | | | | | 0.1 |
| (c-4) Ethyl(2,4,6-trimethylbenzoyl)phenyl phosphinate | | | | | | | | | | | | 0.1 |
| (d-1) 3-Methacryloxypropyltrimethoxysilane | 1.0 | 1.0 | 1.0 | 1.0 | 1.0 | 1.0 | 1.0 | 1.0 | 1.0 | 1.0 | 1.0 | 1.0 |
| (e-1) MQ resin Mw: 26200 | 40.0 | 40.0 | | | 20.0 | | | | | | | |
| (e-2) MQ resin Mw: 1,990,000 | | | 40.0 | 40.0 | 20.0 | | | 20.0 | | 40.0 | | 40.0 |
| (e-3) MDQ resin Mw: 52,120 | | | | | | 40.0 | 40.0 | 20.0 | | | | |
| (f-1) p-t-butylcatechol | 0.04 | 0.04 | 0.04 | 0.04 | 0.04 | 0.04 | 0.04 | 0.04 | 0.04 | 0.04 | 0.04 | 0.02 |
| (f-2) p-methoxyphenol | | | | | | | | | | | | 0.02 |
| Total | 100.0 | 100.0 | 100.0 | 100.0 | 100.0 | 100.0 | 100.0 | 100.0 | 100.0 | 100.0 | 100.0 | 100.0 |
| HS: Number of SH groups in (A), mmol | 7.8 | 4.9 | 7.8 | 4.9 | 7.8 | 7.8 | 5.8 | 7.8 | 7.8 | 4.4 | 4.9 | 7.8 |
| ViB1: Number of vinyl groups in (B1), mmol | 1.9 | 2.2 | 1.9 | 2.2 | 1.9 | 1.9 | 2.1 | 1.9 | 1.8 | 0.8 | 1.6 | 1.8 |
| ViB2: Number of vinyl groups in (B2), mmol | 4.0 | 0.0 | 4.0 | 0.0 | 4.0 | 4.0 | 0.0 | 4.0 | 4.0 | 2.0 | 2.0 | 5.0 |
| ViB: Number of vinyl groups in (B1) and (B2), mmol | 5.9 | 2.2 | 5.9 | 2.2 | 5.9 | 5.9 | 2.1 | 5.9 | 5.8 | 2.8 | 3.6 | 6.8 |
| Proportion (%) of vinyl groups in (B2) to vinyl groups in (B) | 68.1 | 0.0 | 68.1 | 0.0 | 68.1 | 68.1 | 0.0 | 68.1 | 69.6 | 72.0 | 56.5 | 73.9 |
| ViD: Number of vinyl groups in (D), mmol | 4.0 | 4.0 | 4.0 | 4.0 | 4.0 | 4.0 | 4.0 | 4.0 | 4.0 | 4.0 | 4.0 | 4.0 |

TABLE 1-continued

|  | Ex. 1 | Comp. Ex 1 | Ex. 2 | Comp. ex 2 | Ex. 3 | Ex. 4 | Comp. Ex 3 | Ex. 5 | Ex. 6 | Comp. Ex 5 | Ex. 7 |
|---|---|---|---|---|---|---|---|---|---|---|---|
| ViB + ViD: Number of vinyl groups in (B) and (D), mmol | 9.9 | 6.2 | 9.9 | 6.2 | 9.9 | 9.9 | 6.2 | 9.9 | 9.8 | 6.8 | 7.6 | 10.8 |
| HS/(ViB + ViD) | 0.78 | 0.78 | 0.78 | 0.78 | 0.78 | 0.78 | 0.94 | 0.78 | 0.79 | 0.65 | 0.65 | 0.72 |
| HS/ViD | 1.93 | 1.20 | 1.93 | 1.20 | 1.93 | 1.93 | 1.44 | 1.93 | 1.93 | 1.10 | 1.22 | 1.95 |
| HS/ViB | 1.31 | 2.24 | 1.31 | 2.24 | 1.31 | 1.31 | 2.73 | 1.31 | 1.34 | 1.59 | 1.38 | 1.15 |
| HS/ViB1 | 4.12 | 2.24 | 4.12 | 2.24 | 4.12 | 4.12 | 2.73 | 4.12 | 4.42 | 5.68 | 3.18 | 4.41 |

Note: Column header row shows 11 columns but data has 12 values; the first column group (Ex.1) appears to be repeated.

TABLE 2

|  |  | Ex. 1 | Comp. Ex 1 | Ex. 2 | Comp. Ex 2 | Ex. 3 | Ex. 4 |
|---|---|---|---|---|---|---|---|
| Viscosity of composition cP/23° C. | 12 rpm | 24,000 | 26,500 | 63,000 | 65,300 | 38,000 | 32,000 |
|  | 6 rpm | 25,060 | 27,600 | 67,600 | 69,800 | 40,100 | 33,600 |
| Thixotropy |  | 1.044 | 1.042 | 1.073 | 1.069 | 1.055 | 1.050 |
| Dischargeability, 20 G needle, 10 sec; g |  | 0.78 | 0.76 | 0.67 | 0.63 | 0.74 | 0.75 |
| Visible light transmittance after curing, % |  | 98.7 | 98.8 | 98.6 | 98.7 | 98.7 | 98.9 |
| Cure shrinkage % |  | 0.13 | 0.12 | 0.13 | 0.12 | 0.13 | 0.13 |
| E hardness after curing |  | 13 | 8 | 14 | 7 | 13 | 10 |
| Curability test (E hardness) | 1000 mJ/cm$^2$ | 0 | — | 0 | — | 0 | 0 |
|  | 2000 mJ/cm$^2$ | 2 | — | 4 | — | 3 | 1 |
|  | 3000 mJ/cm$^2$ | 7 | — | 10 | 1 | 8 | 5 |
|  | 4000 mJ/cm$^2$ | 12 | 1 | 14 | 2 | 12 | 8 |
|  | 5000 mJ/cm$^2$ | 13 | 2 | 14 | 3 | 13 | 9 |
|  | 6000 mJ/cm$^2$ | 13 | 5 |  | 5 | 13 | 10 |
|  | 7000 mJ/cm$^2$ |  | 7 |  | 7 |  | 10 |
|  | 8000 mJ/cm$^2$ |  | 8 |  | 7 |  |  |
| Elongation after curing, % |  | 180 | 140 | 190 | 140 | 180 | 230 |
| Indentation test | 10 kgf | ○ | ○ | ○ | ○ | ○ | ○ |
|  | 20 kgf | ○ | ○ | ○ | ○ | ○ | ○ |
|  | 30 kgf | ○ | ○ | ○ | ○ | ○ | ○ |
|  | 40 kgf | ○ | ○ | ○ | ○ | ○ | ○ |

|  |  | Comp. Ex 3 | Ex. 5 | Comp. Ex 4 | Ex. 6 | Comp. Ex 5 | Ex. 7 |
|---|---|---|---|---|---|---|---|
| Viscosity of composition cP/23° C. | 12 rpm | 33,200 | 68,000 | 67,800 | 121,000 | 74,500 | 67,300 |
|  | 6 rpm | 34,900 | 72,300 | 67,700 | 136,000 | 74,300 | 74,300 |
| Thixotropy |  | 1.051 | 1.063 | 0.999 | 1.124 | 0.997 | 1.104 |
| Dischargeability, 20 G needle, 10 sec; g |  | 0.74 | 0.61 | 0.64 | 0.48 | 0.63 | 0.59 |
| Visible light transmittance after curing, % |  | 99.0 | 98.8 | 98.6 | 98.6 | 98.6 | 98.7 |
| Cure shrinkage % |  | 0.13 | 0.13 | 0.13 | 0.13 | 0.13 | 0.13 |
| E hardness after curing |  | 10 | 12 | 5 | 4 | 3 | 12 |
| Curability test (E hardness) | 1000 mJ/cm$^2$ | — | 0 | 0 | 0 | — | 1 |
|  | 2000 mJ/cm$^2$ | 0 | 2 | 0-1 | 0-1 | — | 6 |
|  | 3000 mJ/cm$^2$ | 0-1 | 7 | 1 | 1 | 0 | 10 |
|  | 4000 mJ/cm$^2$ | 1 | 10 | 3 | 2 | 0-1 | 12 |
|  | 5000 mJ/cm$^2$ | 3 | 12 | 5 | 3 | 1 | 12 |
|  | 6000 mJ/cm$^2$ | 5 | 12 | 5 | 4 | 1-2 |  |
|  | 7000 mJ/cm$^2$ | 8 |  |  | 4 | 2 |  |
|  | 8000 mJ/cm$^2$ | 9 |  |  |  | 3 |  |
| Elongation after curing, % |  | 180 | 210 | 130 | 260 | 140 | 220 |
| Indentation test | 10 kgf | ○ | ○ | ○ | ○ | ○ | ○ |
|  | 20 kgf | ○ | ○ | ○ | ○ | ○ | ○ |
|  | 30 kgf | ○ | ○ | ○ | ○ | ○ | ○ |
|  | 40 kgf | ○ | ○ | ○ | ○ | ○ | ○ |

TABLE 3

|  |  | Ex. 1 | Comp. Ex 1 | Ex. 2 | Comp. Ex 2 | Ex. 3 | Ex. 4 |
|---|---|---|---|---|---|---|---|
| Crack resistance and discoloration | Heat shock | OK | OK | OK | OK | OK | OK |
|  | Hot and humid conditions | OK | OK | OK | OK | OK | OK |
| Cohesive failure rate % Adherend: acrylic | Immediately after UV exposure | 100 | 100 | 100 | 100 | 100 | 100 |
|  | After 1 day | 100 | 100 | 100 | 100 | 100 | 100 |
|  | After 3 days | 100 | 100 | 100 | 100 | 100 | 100 |

TABLE 3-continued

| | | | | | | | |
|---|---|---|---|---|---|---|---|
| Cohesive failure rate % Adherend: glass | Immediately after UV exposure | 100 | 100 | 100 | 100 | 100 | 100 |
| | After 1 day | 100 | 100 | 100 | 100 | 100 | 100 |
| | After 3 days | 100 | 100 | 100 | 100 | 100 | 100 |
| Cohesive failure rate % With polarizing plates | Untreated | 100 | 100 | 100 | 100 | 100 | 100 |
| | Antireflection coated | 100 | 100 | 100 | 100 | 100 | 100 |
| | Hard coated | 100 | 100 | 100 | 100 | 100 | 100 |
| Cohesive failure rate % | With aluminum | After 1 day | 100 | 100 | 100 | 100 | 100 | 100 |
| | With stainless steel | After 1 day | 100 | 100 | 100 | 100 | 100 | 100 |
| Haze under hot and humid conditions | | 0.45 | 0.49 | 0.44 | 0.47 | 0.44 | 0.41 |
| Joint performance (Boundary appearance) | | ○ | ○ | ○ | ○ | ○ | ◎ |
| Temperature cycle adhesion test | After 1 cycle | OK | OK | OK | Small crack | OK | OK |
| | After 2 cycles | OK | Sep. | OK | Sep. | OK | OK |
| | After 3 cycles | OK | — | OK | — | OK | OK |

| | | Comp. Ex 3 | Ex. 5 | Comp. Ex 4 | Ex. 6 | Comp. Ex 5 | Ex. 7 |
|---|---|---|---|---|---|---|---|
| Crack resistance and discoloration | Heat shock | OK | OK | OK | OK | OK | OK |
| | Hot and humid conditions | OK | OK | OK | OK | OK | OK |
| Cohesive failure rate % Adherend: acrylic | Immediately after UV exposure | 100 | 100 | 100 | 100 | 100 | 100 |
| | After 1 day | 100 | 100 | 100 | 100 | 100 | 100 |
| | After 3 days | 100 | 100 | 100 | 100 | 100 | 100 |
| Cohesive failure rate % Adherend: glass | Immediately after UV exposure | 100 | 100 | 100 | 100 | 100 | 100 |
| | After 1 day | 100 | 100 | 100 | 100 | 100 | 100 |
| | After 3 days | 100 | 100 | 100 | 100 | 100 | 100 |
| Cohesive failure rate % With polarizing plates | Untreated | 100 | 100 | 0 | 95 | 5 | 100 |
| | Antireflection coated | 100 | 100 | 5 | 100 | 10 | 100 |
| | Hard coated | 100 | 100 | 15 | 100 | 10 | 100 |
| Cohesive failure rate % | With aluminum | After 1 day | 100 | 100 | 100 | 100 | 100 | 100 |
| | With stainless steel | After 1 day | 100 | 100 | 100 | 100 | 100 | 100 |
| Haze under hot and humid conditions | | 0.44 | 0.42 | 0.49 | 0.45 | 0.48 | 0.45 |
| Joint performance (Boundary appearance) | | ◎ | ◎ | ○ | ○-Δ | ○-Δ | ○ |
| Temperature cycle adhesion test | After 1 cycle | Small crack | OK | Sep. | OK | OK | OK |
| | After 2 cycles | Sep. | OK | — | OK | Sep. | OK |
| | After 3 cycles | — | OK | — | OK | — | OK |

TABLE 4

| | | Microgauge (after 1 min, 2 g) | | Microgauge (after 5 min, 1 g) | | Needle (14 G) | | Needle (20 G) | |
|---|---|---|---|---|---|---|---|---|---|
| | Thixotropic ratio | Distance to edge of 5 cm square glass | Diameter (cm) | Distance to edge of 5 cm square glass | Diameter (cm) | Immediately after application (mm) | After 1 min (mm) | Immediately after application (mm) | After 1 min (mm) |
| Example 1 | 1.044 | 0.63 cm to edge | 3.75 | 1.25 cm to edge | 2.5 | 1.61 | 1.69 | 0.66 | 0.69 |
| Comparative example 1 | 1.042 | 0.62 cm to edge | 3.75 | 1.25 cm to edge | 2.5 | 1.6 | 1.68 | 0.65 | 0.68 |
| Example 2 | 1.073 | 0.7 cm to edge | 3.75 | 1.25 cm to edge | 2.5 | 1.57 | 1.63 | 0.64 | 0.67 |
| Comparative example 2 | 1.069 | 0.68 cm to edge | 2.7 | 1.6 cm to edge | 1.8 | 1.56 | 1.62 | 0.63 | 0.65 |
| Example 3 | 1.055 | 0.66 cm to edge | 2.85 | 1.55 cm to edge | 1.9 | 1.59 | 1.66 | 0.65 | 0.67 |
| Example 4 | 1.050 | 0.61 cm to edge | 2.63 | 1.5 cm to edge | 1.75 | 1.62 | 1.76 | 0.68 | 0.74 |
| Comparative example 3 | 1.051 | 0.62 cm to edge | 2.85 | 1.55 cm to edge | 1.9 | 1.62 | 1.75 | 0.66 | 0.71 |
| Example 5 | 1.063 | 0.65 cm to edge | 2.63 | 1.65 cm to edge | 1.75 | 1.59 | 1.64 | 0.65 | 0.69 |
| Comparative example 4 | 0.999 | 0.38 cm to edge | 4.24 | 0.8 cm to edge | 3.4 | 1.6 | 2.23 | 0.68 | 0.89 |
| Example 6 | 1.124 | 1.2 cm to edge | 1.95 | 1.85 cm to edge | 1.3 | 1.55 | 1.58 | 0.63 | 0.65 |
| Comparative example 5 | 0.997 | 0.43 cm to edge | 4.16 | 0.82 cm to edge | 3.36 | 1.58 | 2.26 | 0.67 | 0.88 |
| Example 7 | 1.104 | 1.1 cm to edge | 2.1 | 1.8 cm to edge | 1.4 | 1.56 | 1.59 | 0.64 | 0.66 |

The compositions of Examples afford cured products which exhibit properties such as hardness and adhesion suited for use in image displays. The cured products form inconspicuous joints with sealants, and advantageous viewability may be achieved.

Example 1 and Example 2 have demonstrated that the addition of a high-molecular weight MQ resin improves curability.

From Examples 1 to 3, and Examples 4 and 5, it has been shown that the addition of an MDQ resin makes it possible to control refractive index and to further improve joint performance.

On the other hand, Comparative Examples 1 to 3, which did not involve any aliphatic unsaturated group-containing branched polyorganosiloxanes, compared unfavorably to Examples 1, 2 and 4 in terms of dischargeability and curability and also resulted in poor followability as demonstrated by the difficulty in avoiding the occurrence of separation or cracks in the temperature cycle adhesion test. Further, Comparative Examples 4 and 5, which did not involve any MQ resins or MDQ resins, resulted in poor curability and poor adhesion with respect to polarizing plates.

INDUSTRIAL APPLICABILITY

The inventive dam compositions may form dam frames in image displays which exhibit appropriate hardness and adhesion with respect to adherends. According to a preferred embodiment, the dam frame further has an inconspicuous joint with a sealant applied inside the frame, and consequently image displays having good viewability may be obtained.

The invention claimed is:

1. An image display sealant dam composition that comprises:
  (A) a polyorganosiloxane having a mercaptoalkyl group bonded to a silicon atom, the polyorganosiloxane (A) having a viscosity at 23° C. of 20 to 25000 cP;
  (B) an aliphatic unsaturated group-containing polyorganosilane including an aliphatic unsaturated group-containing a linear polyorganosiloxane (B1) represented by the following formula (I):

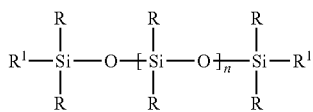

(I)

wherein in the formula (I):
each $R^1$ group independently represents an aliphatic unsaturated group,
each R group independently represents a C1 to C6 alkyl group or a C6 to C12 aryl group, and 1 to 60 mol % of the total R groups are C6 to C12 aryl groups, and
the letter n is a value such that the viscosity at 23° C. is 10,000 to 1,000,000 cP, and
a branched polyorganosiloxane (B2) having $SiO_{4/2}$ units, $R'_3SiO_{1/2}$ units and $R'_2SiO_{2/2}$ units, and optionally further having $R'SiO_{3/2}$ units, wherein in the formulae, each R' group is independently a C1 to C6 alkyl group or an aliphatic unsaturated group, at least three R' groups per molecule of the branched polyorganosiloxane (B2) are aliphatic unsaturated groups, and the proportion of the number of aliphatic unsaturated groups in (B2) to the total number of the aliphatic unsaturated groups in (B) is more than 50% and not more than 95%;
  (C) a photoreaction initiator;
  (D) at least one silane compound; and
  (E) an MQ resin having a weight average molecular weight of 2,000 to 2,500,000 and/or an MDQ resin having a weight average molecular weight of 2,000 to 1,000,000;
wherein a ratio of the number of the mercaptoalkyl groups in (A) to the number of the aliphatic unsaturated groups in (B) is 0.5 to 3.0;
  (E) is in an amount of 30 to 200 parts by weight per 100 parts by weight of (B); and
said dam composition has a viscosity at 23° C. of 20,000 to 150,000 cP,
wherein a thixotropic ratio $V_{6rpm}/V_{12rpm}$ is 1.02 to 1.9, wherein $V_{6rpm}$ and $V_{12rpm}$ are values of the viscosity in cP of said dam composition measured with a B-type rotational viscometer at 23° C. and a rotational speed of 6 rpm, and at 23° C. and a rotational speed of 12 rpm, respectively.

2. An image display sealant dam composition that comprises:
  (A) a polyorganosiloxane having a mercaptoalkyl group bonded to a silicon atom, the polyorganosiloxane (A) having a viscosity at 23° C. of 20 to 25,000 cP;
  (B) an aliphatic unsaturated group-containing polyorganosilane including an aliphatic unsaturated group-containing a linear polyorganosiloxane (B1) represented by the following formula (I):

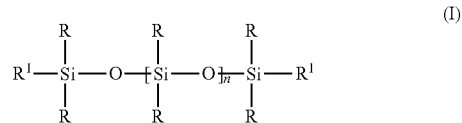

(I)

wherein in the formula (I):
each $R^1$ group independently represents an aliphatic unsaturated group,
each R group independently represents a C1 to C6 alkyl group or a C6 to C12 aryl group, and 1 to 60 mol % of the total R groups are C6 to C12 aryl groups, and
the letter n is a value such that the viscosity at 23° C. is 10,000 to 1,000,000 cP, and
a branched polyorganosiloxane (B2) having $SiO_{4/2}$ units, $R'_3SiO_{1/2}$ units and $R'_2SiO_{2/2}$ units, and optionally further having $R'SiO_{3/2}$ units, wherein each R' group is independently a C1 to C6 alkyl group or an aliphatic unsaturated group, at least three R' groups per molecule of the branched polyorganosiloxane (B2) are aliphatic unsaturated groups, and the proportion of the number of aliphatic unsaturated groups in (B2) to the total number of the aliphatic unsaturated groups in (B) is more than 50% and not more than 95%;
  (C) a photoreaction initiator;
  (D) at least one silane compound; and
  (E) an MQ resin having a weight average molecular weight of 1,000,000 to 2,500,000;
wherein a ratio of the number of the mercaptoalkyl groups in (A) to the number of the aliphatic unsaturated groups in (B) is 0.5 to 3.0;
  (E) is in an amount of 30 to 200 parts by weight per 100 parts by weight of (B); and
said dam composition has a viscosity at 23° C. of 20,000 to 150,000 cP.

3. The image display sealant dam composition according to claim 2, wherein (E) comprises an MDQ resin having a weight average molecular weight of 2,000 to 1,000,000.

4. The image display sealant dam composition according to claim 3, wherein (C) is in an amount of 0.05 to 50 parts by weight per 100 parts by weight of (B).

5. The image display sealant dam composition according to claim 3, wherein (D) is at least one aliphatic unsaturated group-containing silane compound selected from the group consisting of 3-methacryloxypropyltriethoxysilane, 3-methacryloxypropyltrimethoxysilane, vinyltrimethoxysilane and vinyltriethoxysilane.

6. The image display sealant dam composition according to claim 2, wherein (C) is in an amount of 0.05 to 50 parts by weight per 100 parts by weight of (B).

7. The image display sealant dam composition according to claim 2, wherein (D) is at least one aliphatic unsaturated group-containing silane compound selected from the group consisting of 3-methacryloxypropyltriethoxysilane, 3-methacryloxypropyltrimethoxysilane, vinyltrimethoxysilane and vinyltriethoxysilane.

8. The image display sealant dam composition according to claim 1, wherein (C) is in an amount of 0.05 to 50 parts by weight per 100 parts by weight of (B).

9. The image display sealant dam composition according to claim 8, wherein (D) is at least one aliphatic unsaturated group-containing silane compound selected from the group consisting of 3-methacryloxypropyltriethoxysilane, 3-methacryloxypropyltrimethoxysilane, vinyltrimethoxysilane and vinyltriethoxysilane.

10. The image display sealant dam composition according to claim 1, wherein (D) is at least one aliphatic unsaturated group-containing silane compound selected from the group consisting of 3-methacryloxypropyltriethoxysilane, 3-methacryloxypropyltrimethoxysilane, vinyltrimethoxysilane and vinyltriethoxysilane.

11. An image display that comprises an image display component and a protective component sealed with the image display sealant dam composition according to claim 1.

12. The image display sealant dam composition according to claim 1, wherein (E) comprises an MQ resin having a weight average molecular of 1,000,000 to 2,500,000.

13. The image display sealant dam composition according to claim 12, wherein (E) further comprises an MDQ resin having a weight average molecular weight of 2,000 to 1,000,000.

14. The image display sealant dam composition according to claim 13, wherein (C) is in an amount of 0.05 to 50 parts by weight per 100 parts by weight of (B).

15. The image display sealant dam composition according to claim 14, wherein (D) is at least one aliphatic unsaturated group-containing silane compound selected from the group consisting of 3-methacryloxypropyltriethoxysilane, 3-methacryloxypropyltrimethoxysilane, vinyltrimethoxysilane and vinyltriethoxysilane.

16. The image display sealant dam composition according to claim 13, wherein (D) is at least one aliphatic unsaturated group-containing silane compound selected from the group consisting of 3-methacryloxypropyltriethoxysilane, 3-methacryloxypropyltrimethoxysilane, vinyltrimethoxysilane and vinyltriethoxysilane.

17. The image display sealant dam composition according to claim 12, wherein (C) is in an amount of 0.05 to 50 parts by weight per 100 parts by weight of (B).

18. The image display sealant dam composition according to claim 12, wherein (D) is at least one aliphatic unsaturated group-containing silane compound selected from the group consisting of 3-methacryloxypropyltriethoxysilane, 3-methacryloxypropyltrimethoxysilane, vinyltrimethoxysilane and vinyltriethoxysilane.

* * * * *